Figure 5:
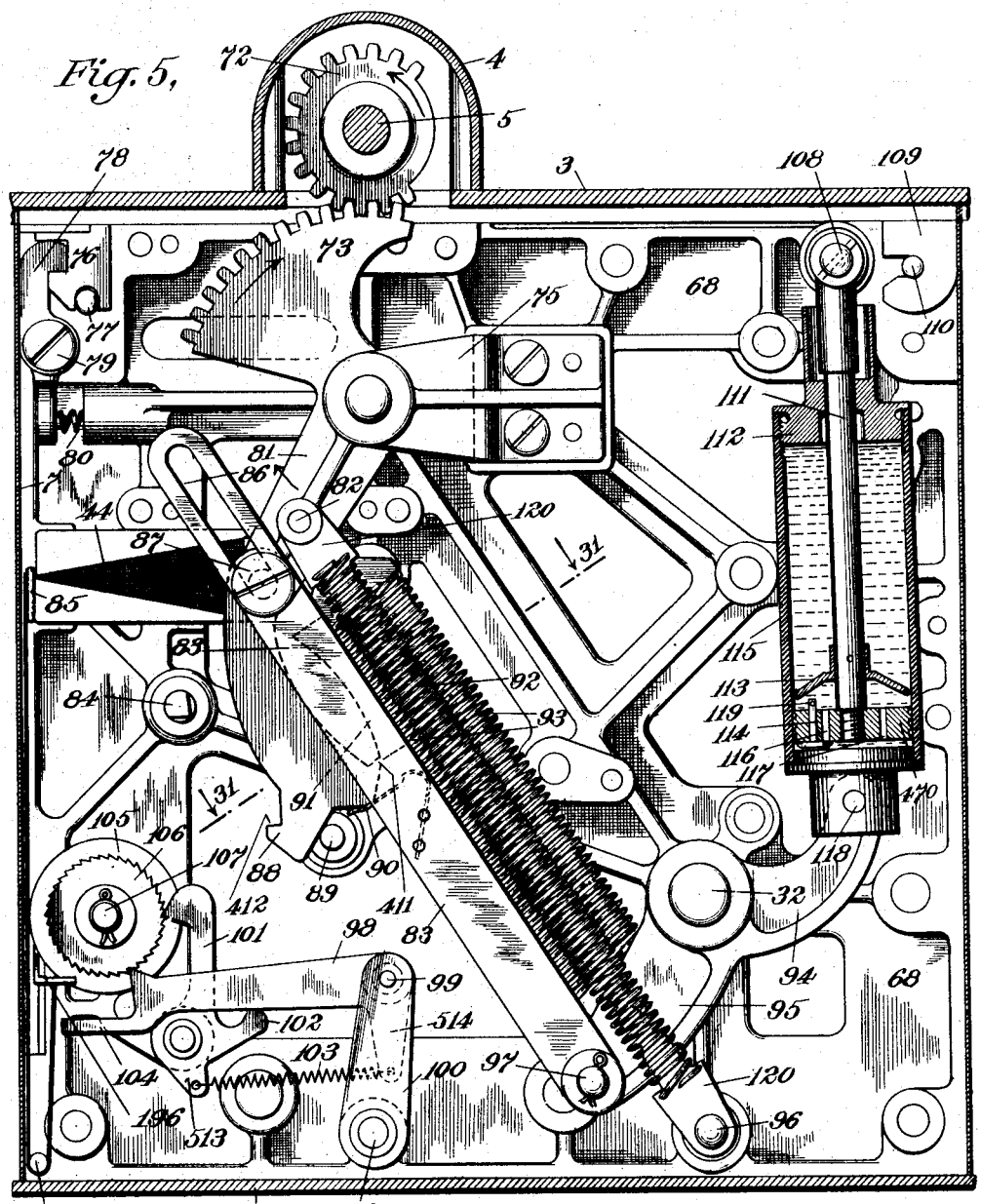

J. W. BRYCE.
TIME RECORDER.
APPLICATION FILED JUNE 3, 1908.
1,190,217.
Patented July 4, 1916.
20 SHEETS—SHEET 1.
Fig.1,
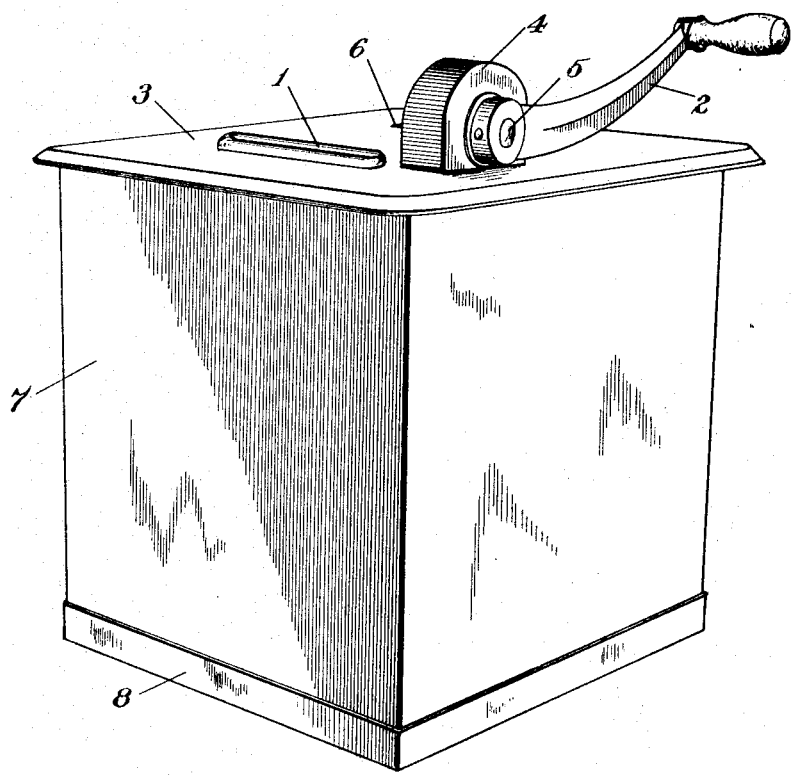
WITNESSES:
INVENTOR
James W. Bryce
BY
Kenyon & Kenyon
ATTORNEYS

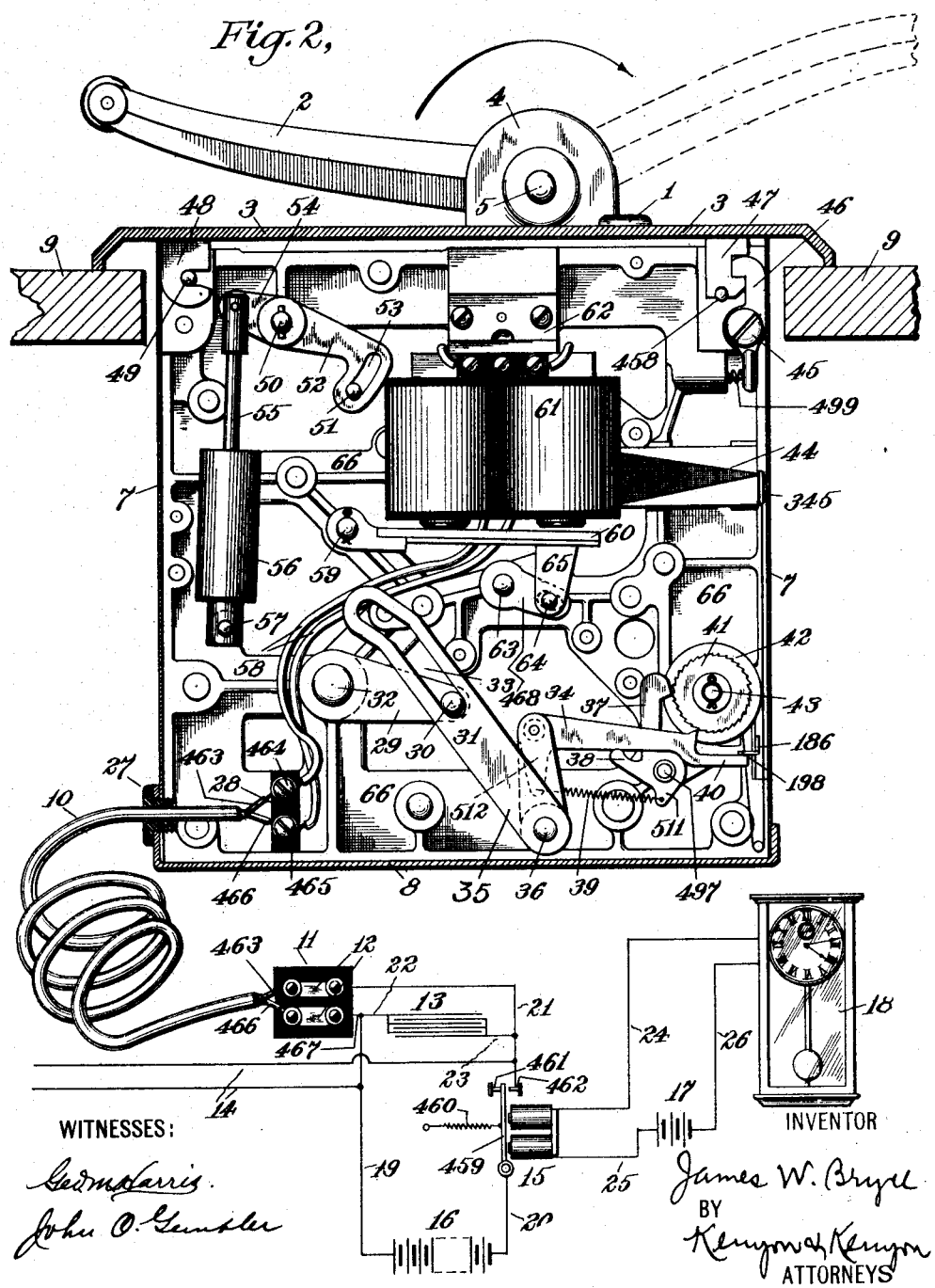

J. W. BRYCE.
TIME RECORDER.
APPLICATION FILED JUNE 3, 1908.
1,190,217.
Patented July 4, 1916.
20 SHEETS—SHEET 3.
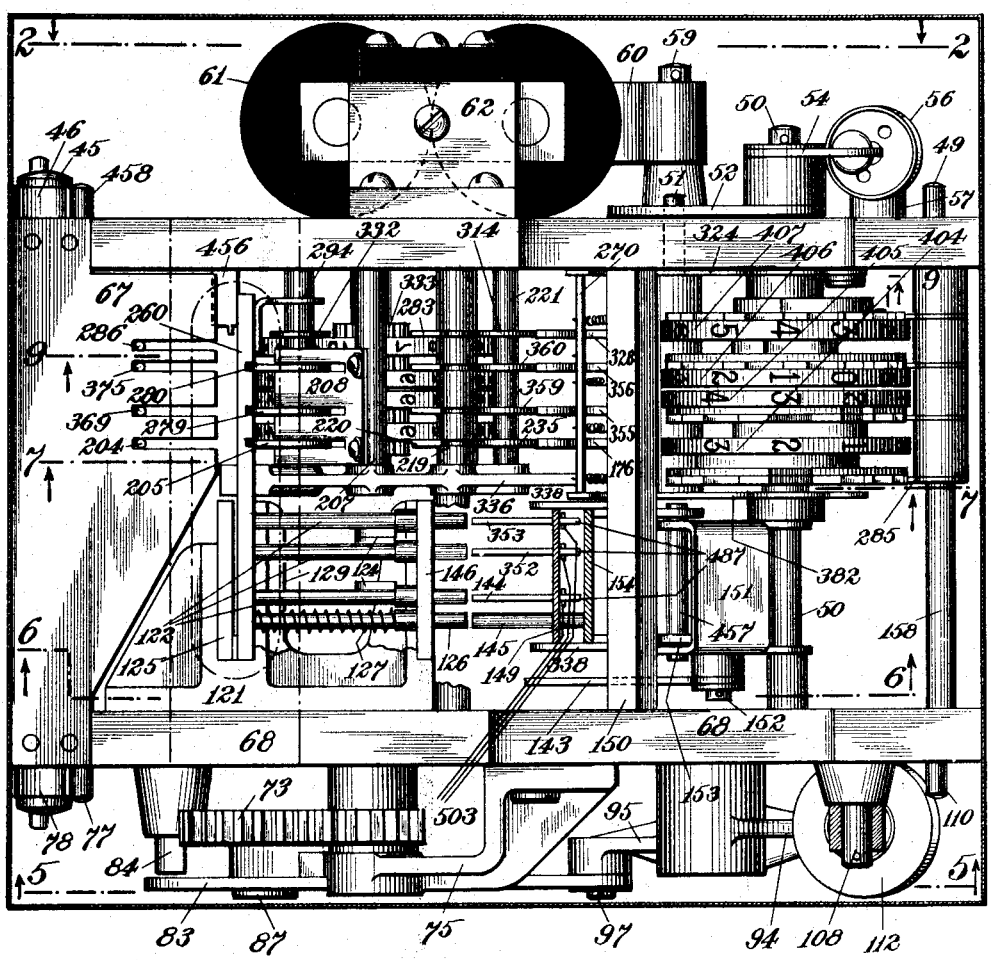
Fig. 3,
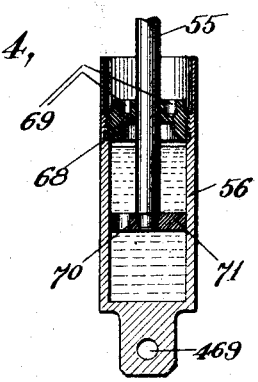
Fig. 4,
WITNESSES:
INVENTOR
James W. Bryce
BY
Kenyon & Kenyon
ATTORNEYS

J. W. BRYCE.
TIME RECORDER.
APPLICATION FILED JUNE 3, 1908.

1,190,217.

Patented July 4, 1916.
20 SHEETS—SHEET 4.

WITNESSES:

INVENTOR

James W. Bryce
BY
Kenyon & Kenyon
ATTORNEYS

J. W. BRYCE.
TIME RECORDER.
APPLICATION FILED JUNE 3, 1908.

1,190,217.

Patented July 4, 1916.
20 SHEETS—SHEET 6.

Fig. 7,

WITNESSES:

INVENTOR
James W. Bryce
BY
Kenyon & Kenyon
ATTORNEYS

J. W. BRYCE.
TIME RECORDER.
APPLICATION FILED JUNE 3, 1908.

1,190,217.

Patented July 4, 1916.
20 SHEETS—SHEET 8.

WITNESSES:

INVENTOR
James W. Bryce
BY
Kenyon & Kenyon
ATTORNEYS

J. W. BRYCE.
TIME RECORDER.
APPLICATION FILED JUNE 3, 1908.

1,190,217.

Patented July 4, 1916.
20 SHEETS—SHEET 9.

WITNESSES:

INVENTOR
James W Bryce
BY
Kenyon & Kenyon
ATTORNEYS

J. W. BRYCE.
TIME RECORDER.
APPLICATION FILED JUNE 3, 1908.
1,190,217.
Patented July 4, 1916.
20 SHEETS—SHEET 10.
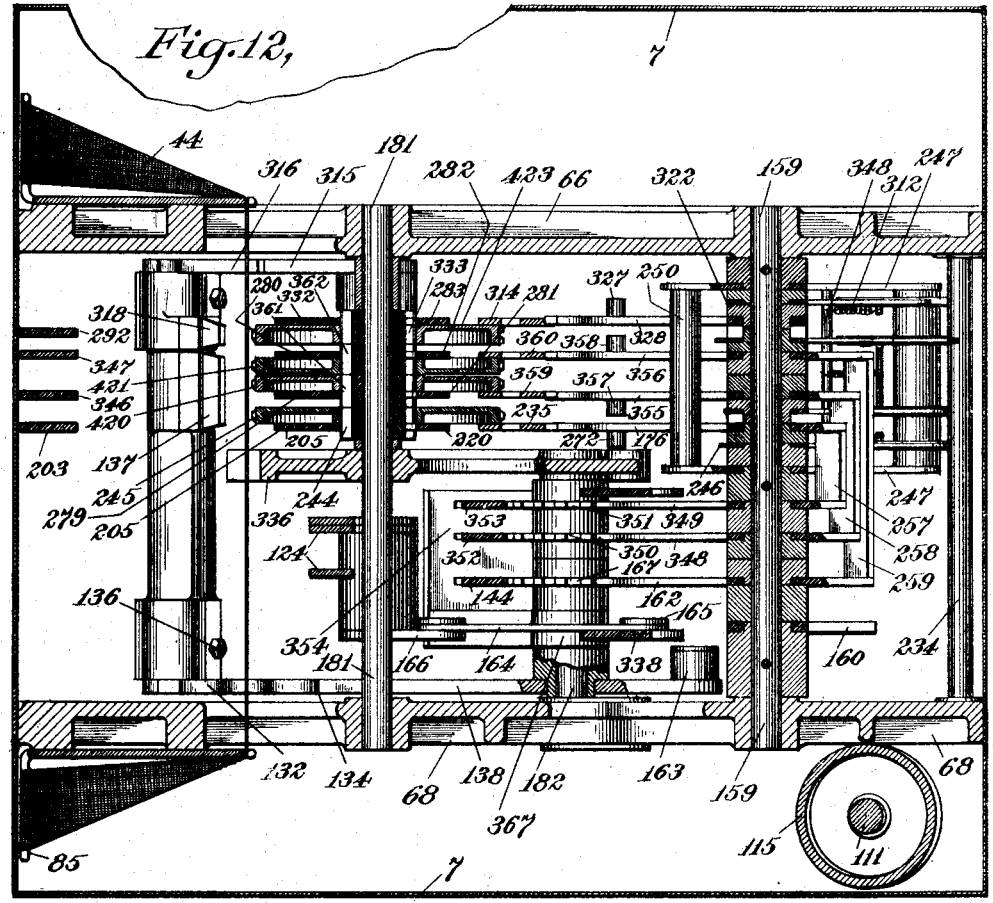
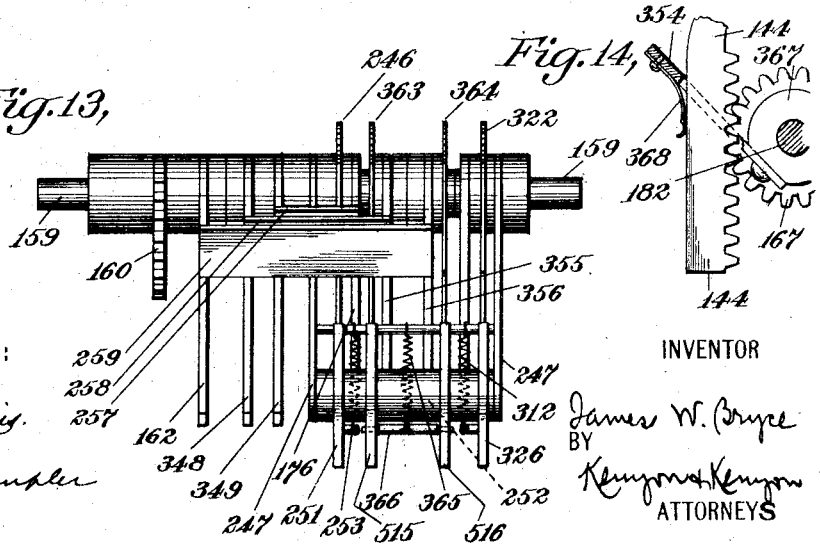

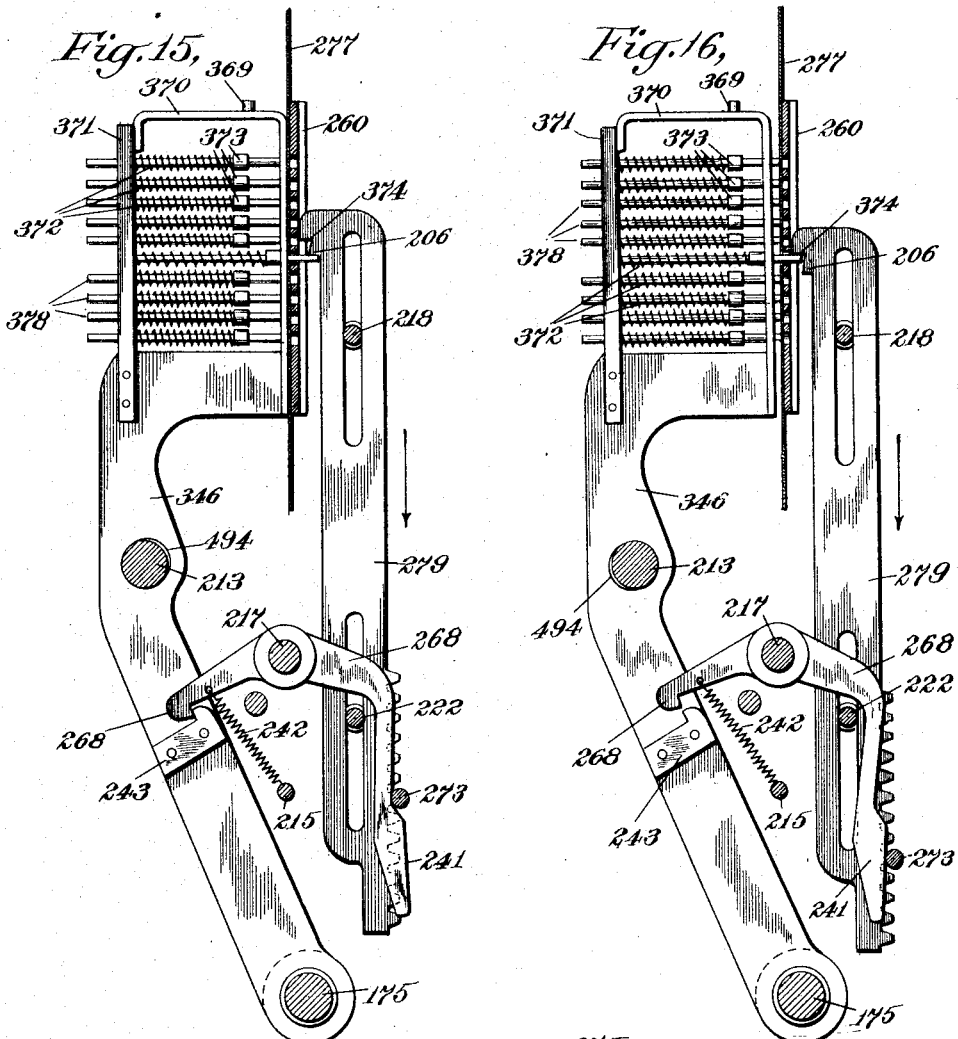

J. W. BRYCE.
TIME RECORDER.
APPLICATION FILED JUNE 3, 1908.
1,190,217.
Patented July 4, 1916.
20 SHEETS—SHEET 12.
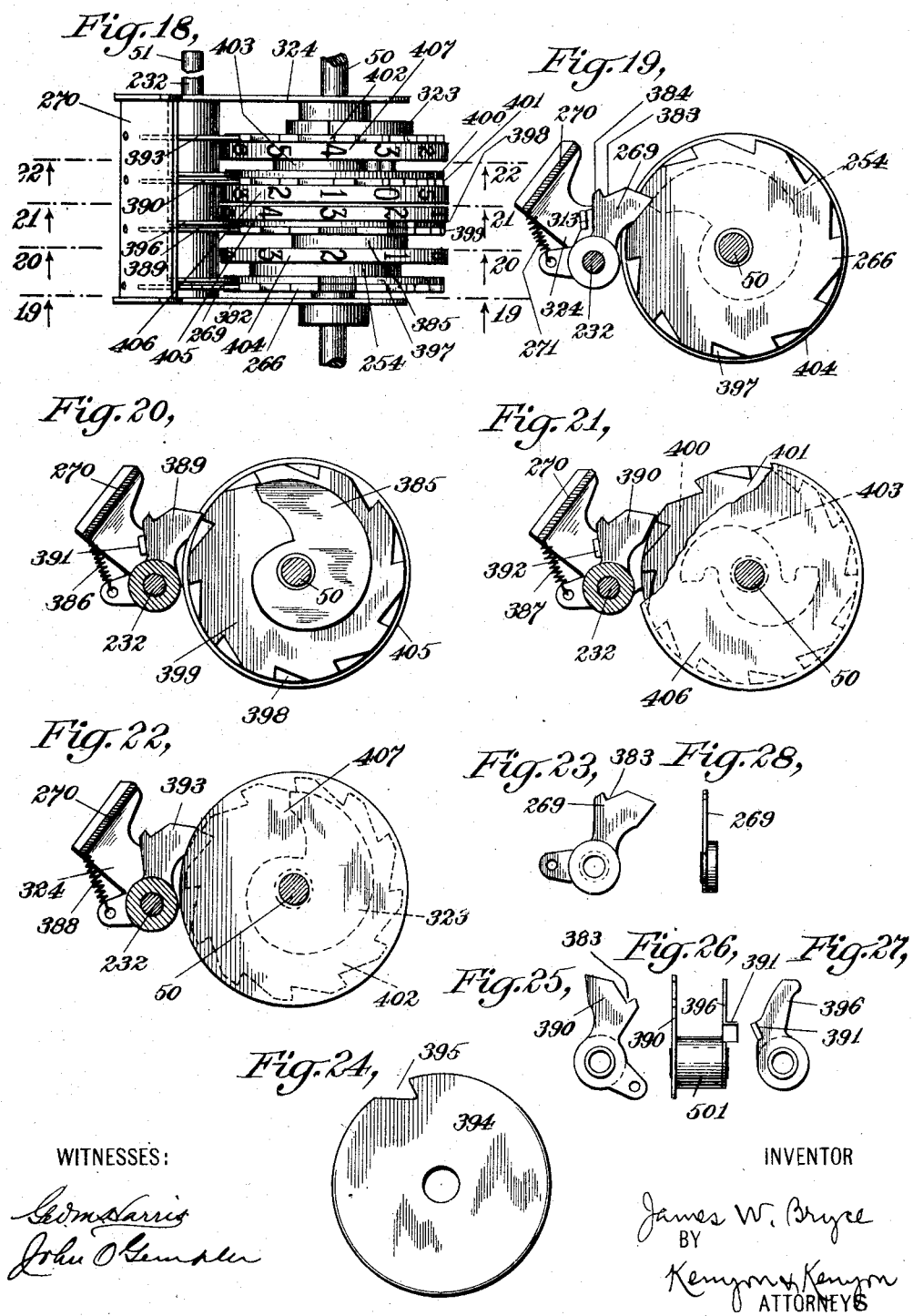

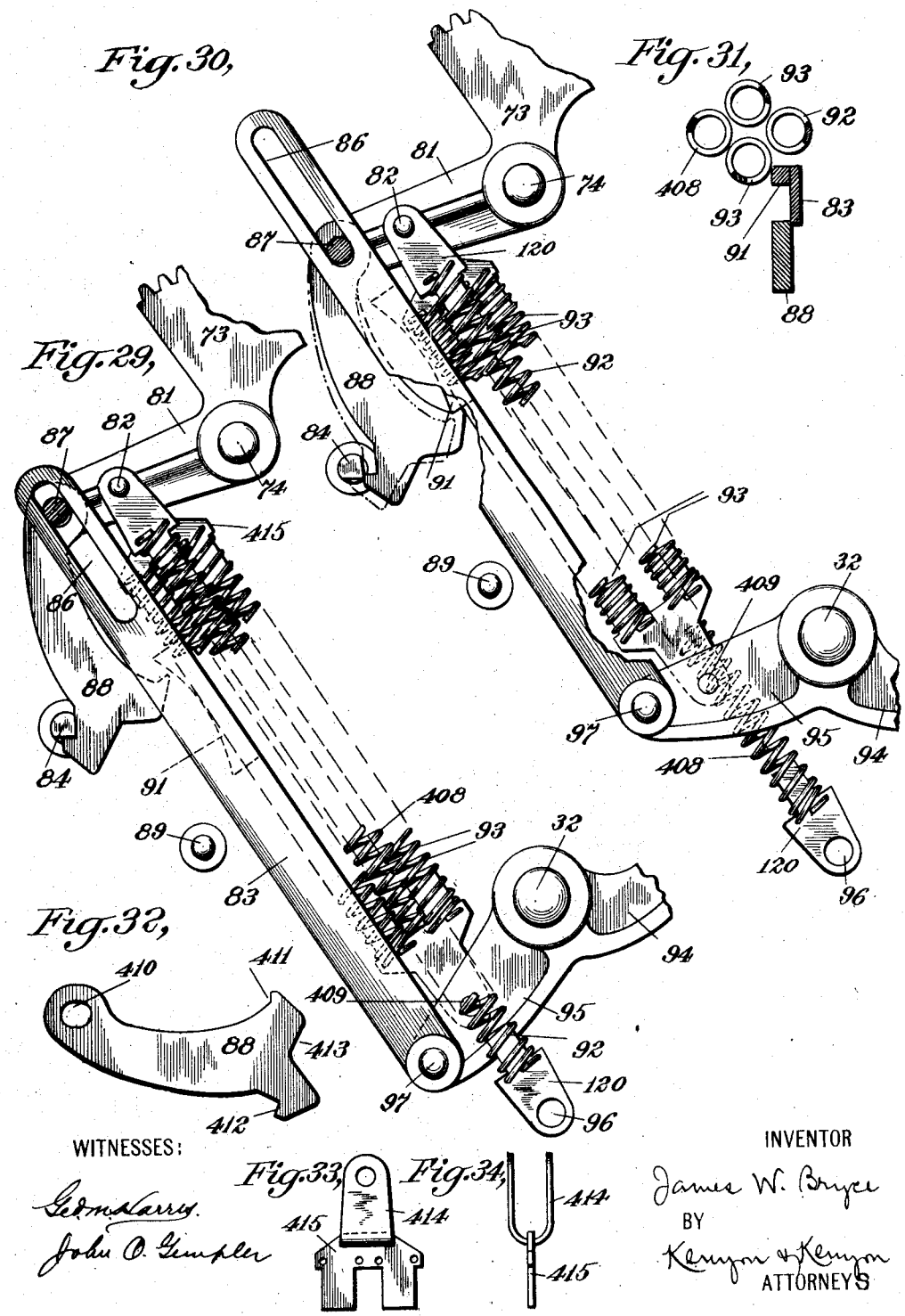

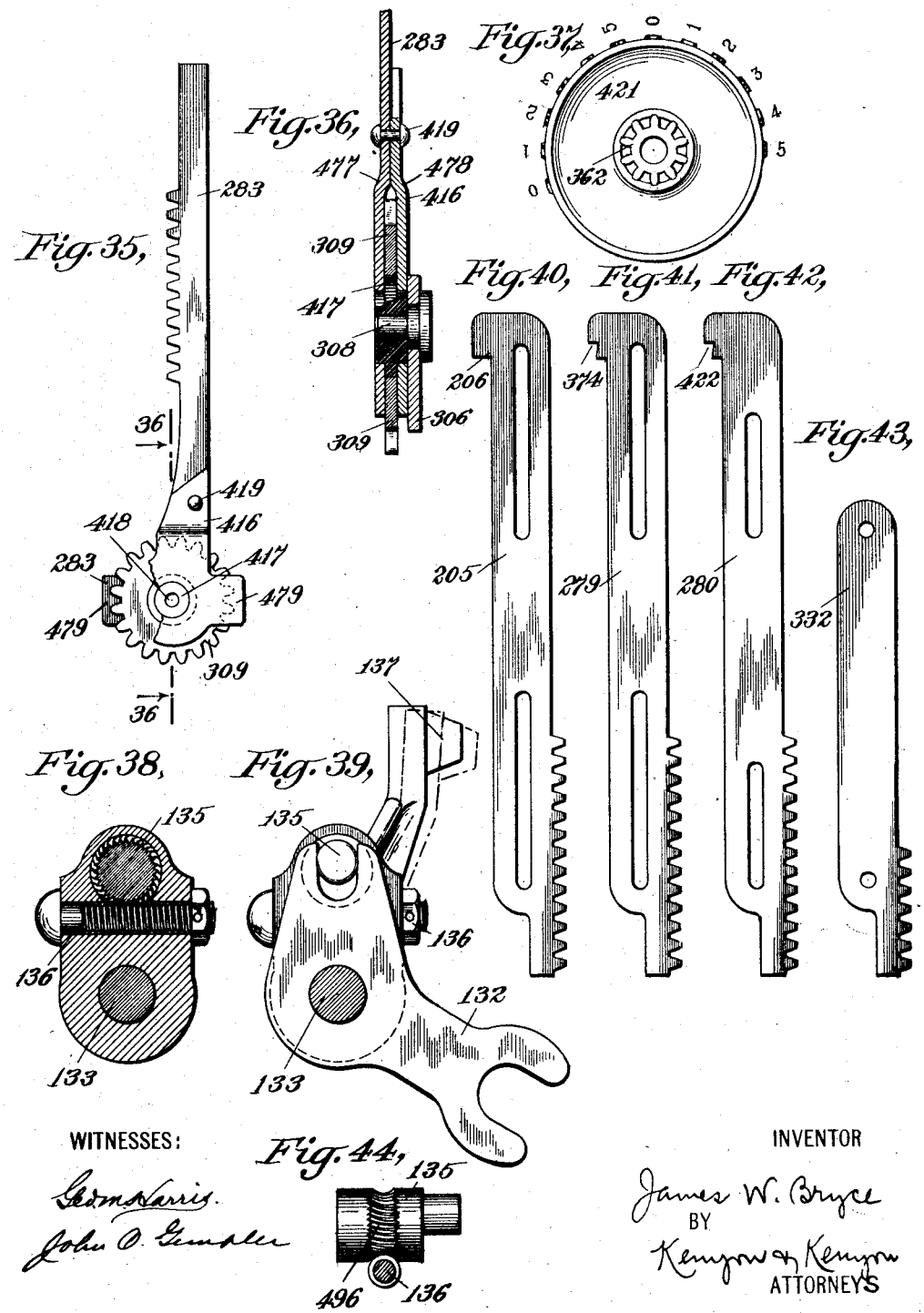

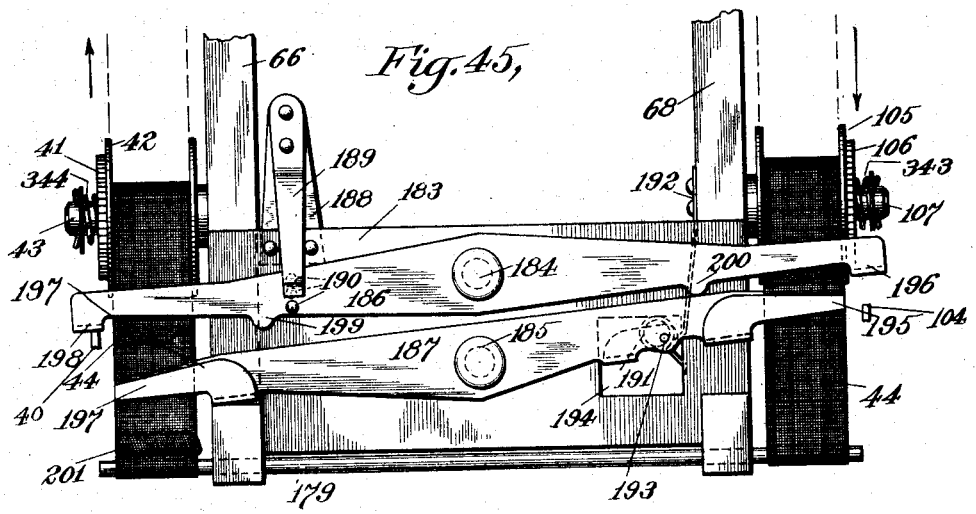
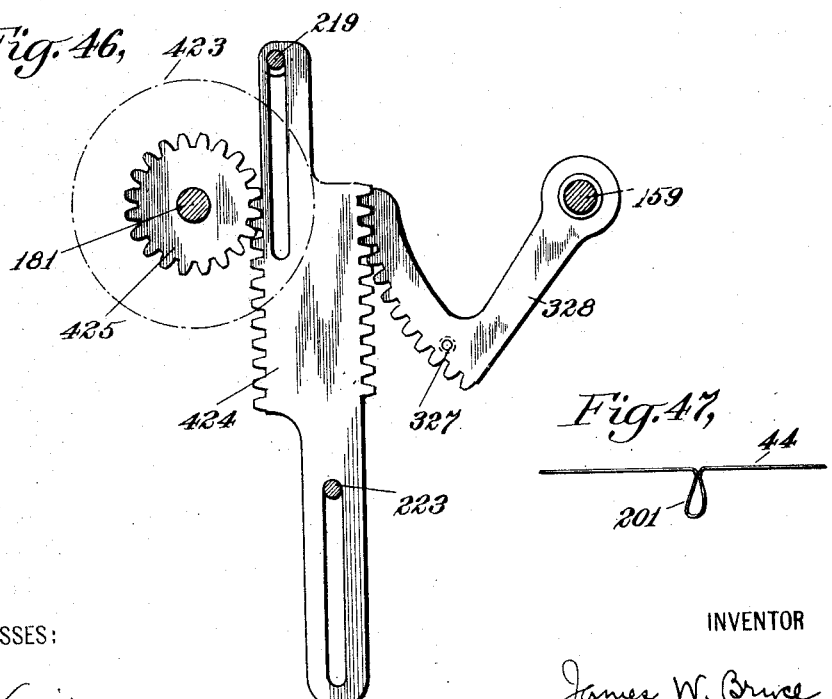

J. W. BRYCE.
TIME RECORDER.
APPLICATION FILED JUNE 3, 1908.

1,190,217.

Patented July 4, 1916.
20 SHEETS—SHEET 16.

J. W. BRYCE.
TIME RECORDER.
APPLICATION FILED JUNE 3, 1908.

1,190,217.

Patented July 4, 1916.
20 SHEETS—SHEET 20.

*Fig. 55.*

*Fig. 56.*

WITNESSES:

INVENTOR
James W. Bryce
BY
Kenyon & Kenyon
ATTORNEYS

UNITED STATES PATENT OFFICE.

JAMES W. BRYCE, OF BROOKLYN, NEW YORK, ASSIGNOR TO INTERNATIONAL TIME RECORDING COMPANY OF NEW YORK, OF ENDICOTT, NEW YORK, A CORPORATION OF NEW YORK.

TIME-RECORDER.

1,190,217.   Specification of Letters Patent.   Patented July 4, 1916.

Application filed June 3, 1908. Serial No. 436,444.

*To all whom it may concern:*

Be it known that I, JAMES W. BRYCE, a citizen of the United States, and a resident of Brooklyn, in the county of Kings and State of New York, have invented certain new and useful Improvements in Time-Recorders, of which the following is a specification.

My invention relates to time recorders.

It is of especial value in machines for indicating elapsed time between two operations, although in some of its features it is not limited to use in such a machine.

It has for its object to improve the operating parts of a time recorder and particularly the connections between the source of power or the driving parts and the driven parts; to render such connections relatively flexible and yielding for the performance of lighter and more delicate work, such as the movement into position of the indicating or recording mechanism, and to render such connections rigid and unyielding for heavier and less delicate work, such for example as the printing or punching operations, and to provide means adapted to make such changes in the said connections efficiently and at the proper time; also to provide indicating or recording mechanism capable of indicating or recording not only time-of-day, but also elapsed time between two operations, so that the same indicating or recording mechanism may at one time indicate or record the time-of-day and at another elapsed time; to provide improved connections between the time recording or indicating mechanism and the timing devices which control the movement of such mechanism, so that in the recording or indicating operation no interference can take place with the operation or movement of such time controlling devices, no matter how long the indicating or recording operation may take, and also so that at the close of such indicating or recording operation the time recording or indicating mechanism may at once be brought into synchronism with the time controlling devices prepared for a correct and accurate performance of the next operation of the machine, and also so that as little load as possible will be placed upon the time controlling devices; also to set the selective devices, which determine the extent of the time-of-day movement of the time type wheels, and to set those selective devices, which control the operation of the punches, by means of the same time controlling devices; also to cause the recording or indicating mechanism to be operated, to record or indicate in accordance with the position of the selective devices, by driving means having always the same extent of movement; also to provide new and improved means for operating elapsed time indicating or recording mechanism; also to provide new and improved means for borrowing one in the subtracting operation of the elapsed time type wheels; also to improve the devices for punching holes in cards to indicate the time of an "in" or earlier operation of the machine, and also means for rendering such punching devices inoperative upon a subsequent or "out" operation; also to provide means whereby, with but a single card slot and a single operating handle, either the time-of-day of an operation of the machine or the elapsed time between two operations may be recorded upon a card, either by printing or punching or both, or in any other suitable way; also generally to improve, simplify and make more accurate and perfect in operation the parts of a time recorder or indicator or an elapsed time recorder or indicator.

My invention consists in the novel devices and combinations herein shown and described.

In the drawings accompanying this specification and forming a part hereof, I have shown my invention in its preferred form and as embodied in a machine which indicates both the time-of-day of an "in" or earlier operation of the machine and the elapsed time between such an operation and a later operation, and which does such indicating by recording upon a card, both by printing figures and by punching holes, the time of the said "in" or earlier operation of the machine and by recording upon the card, by printing in figures, the elapsed time between such operation and a subsequent operation.

My invention, however, at least in some of its features, is not limited to a machine which indicates both the time-of-day and the elapsed time between two operations, nor is it limited to indications or recordings made in the particular manner shown in the drawings.

I will now proceed to describe the preferred form of my invention as disclosed in the particular machine shown in the drawings.

Figure 6:
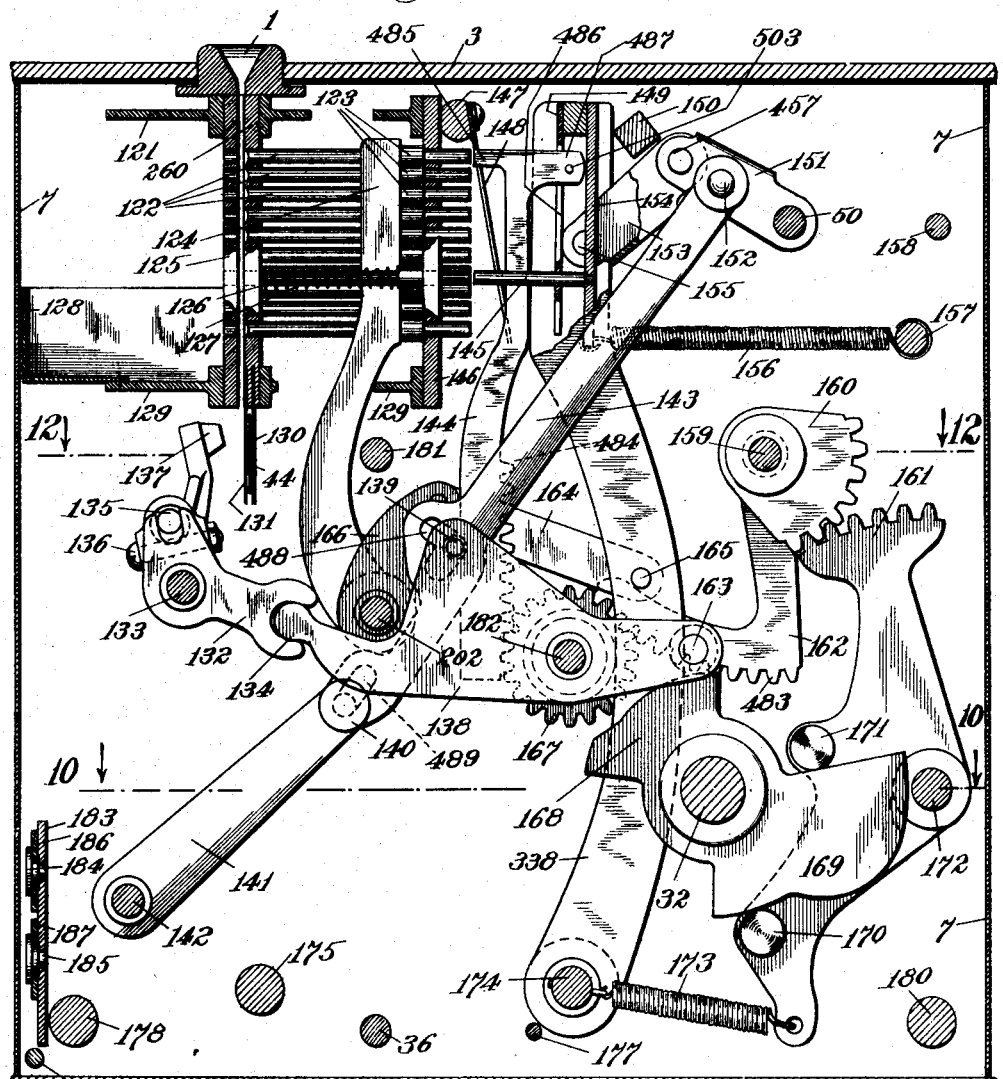
Figure 7:
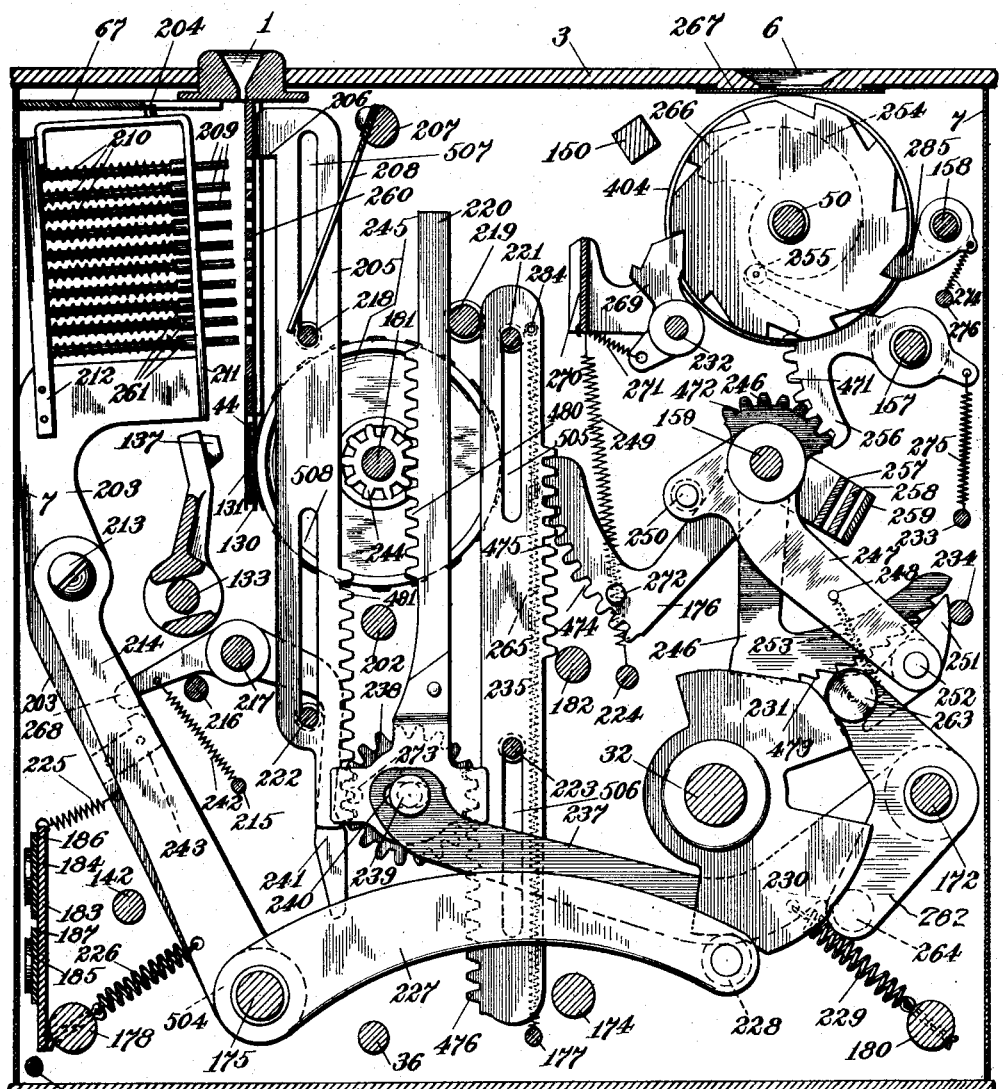
Figure 8:
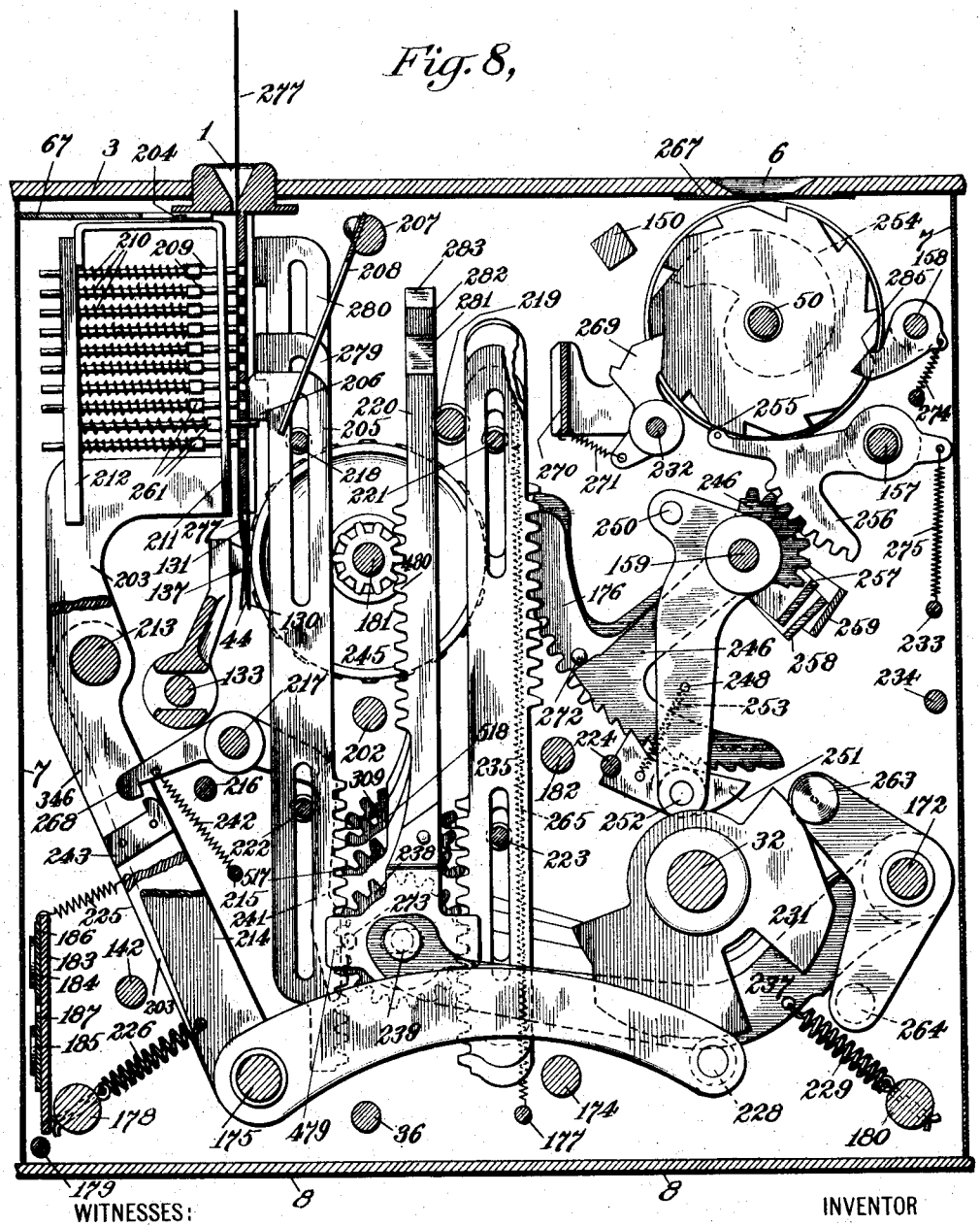
Figure 9:
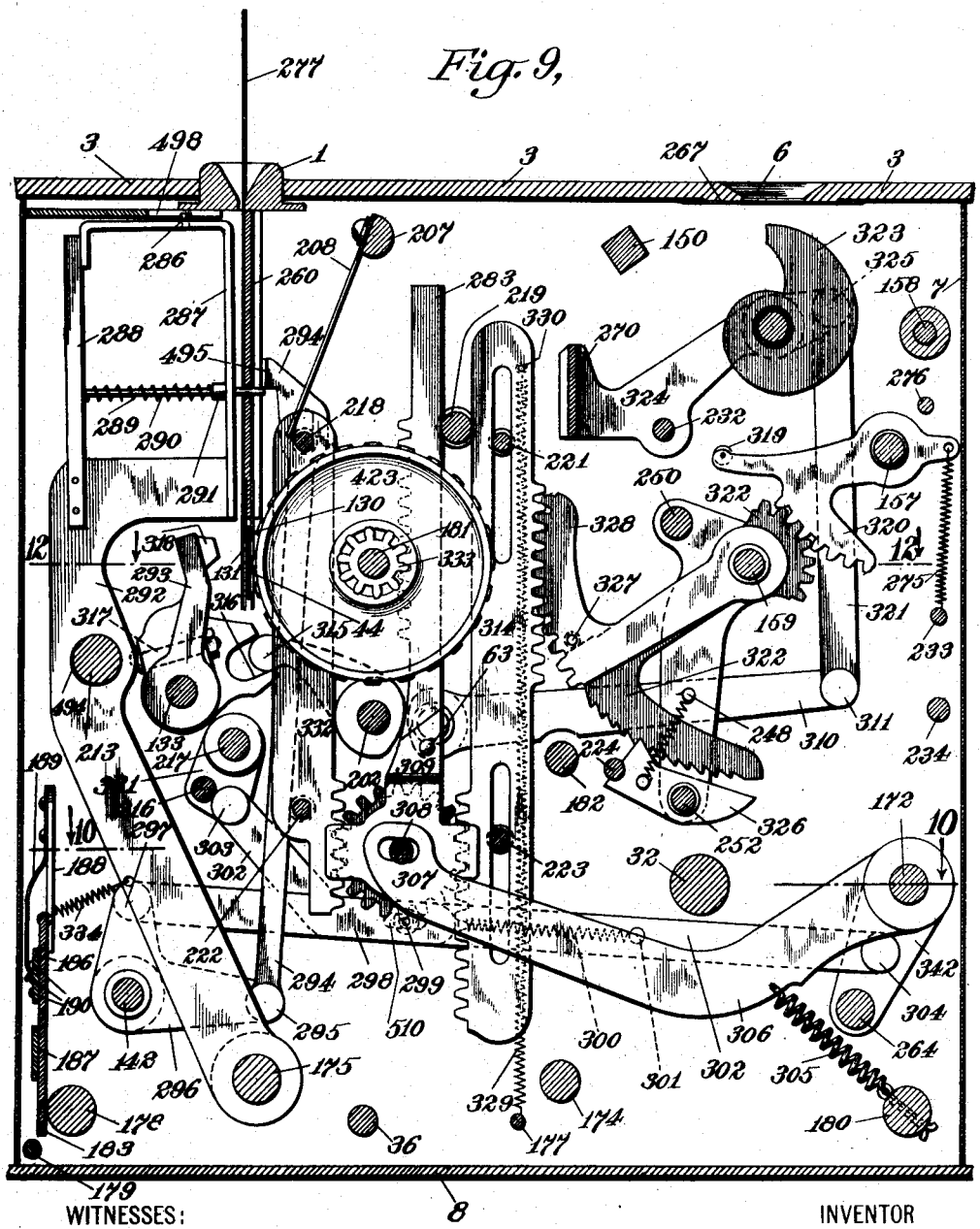
Figure 10:
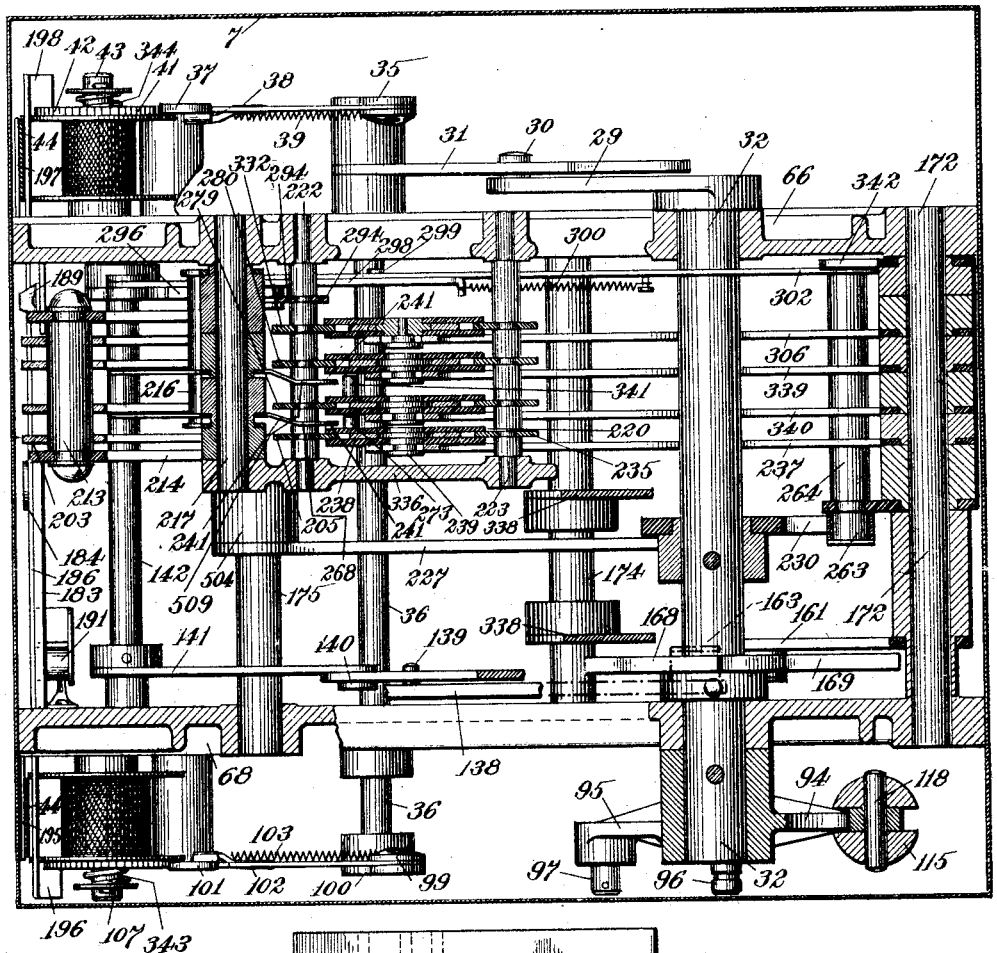
Figure 11:
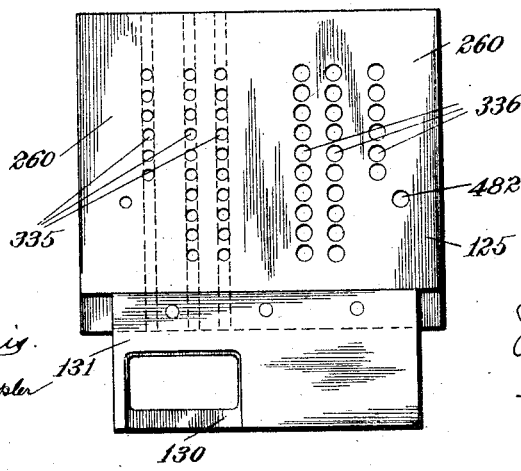
Figure 48:
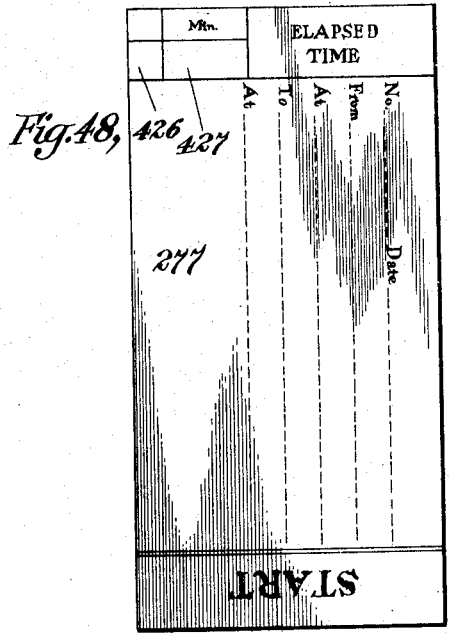
Figure 49:
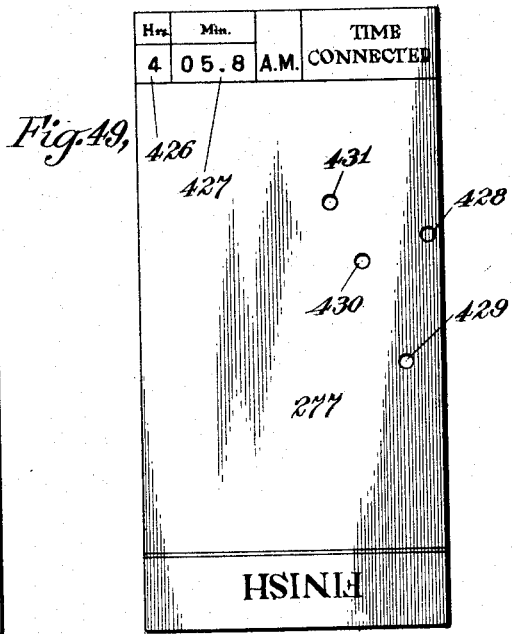
Figure 50:
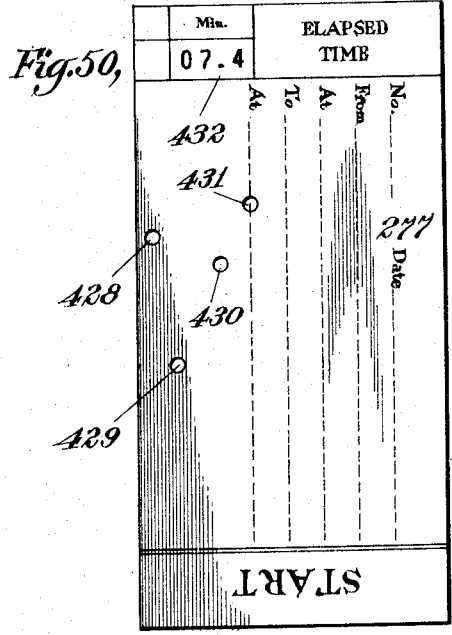
Figure 51:
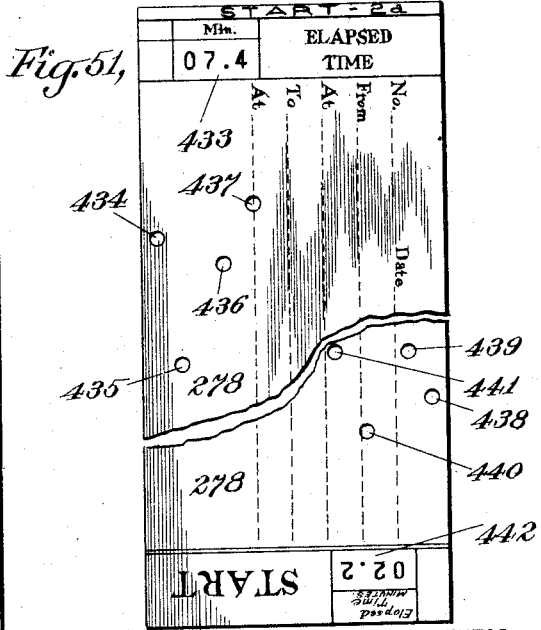
Figure 52:
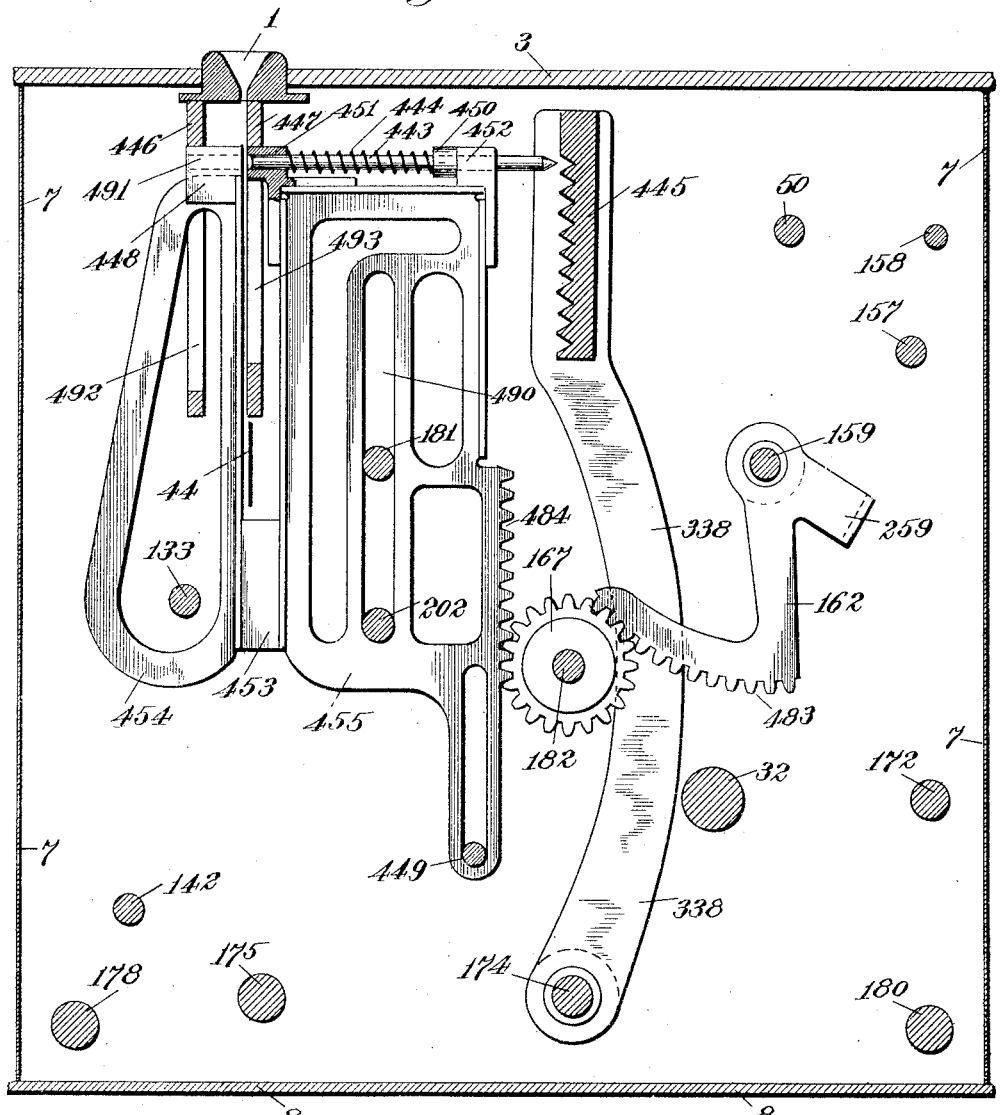
Figure 53:
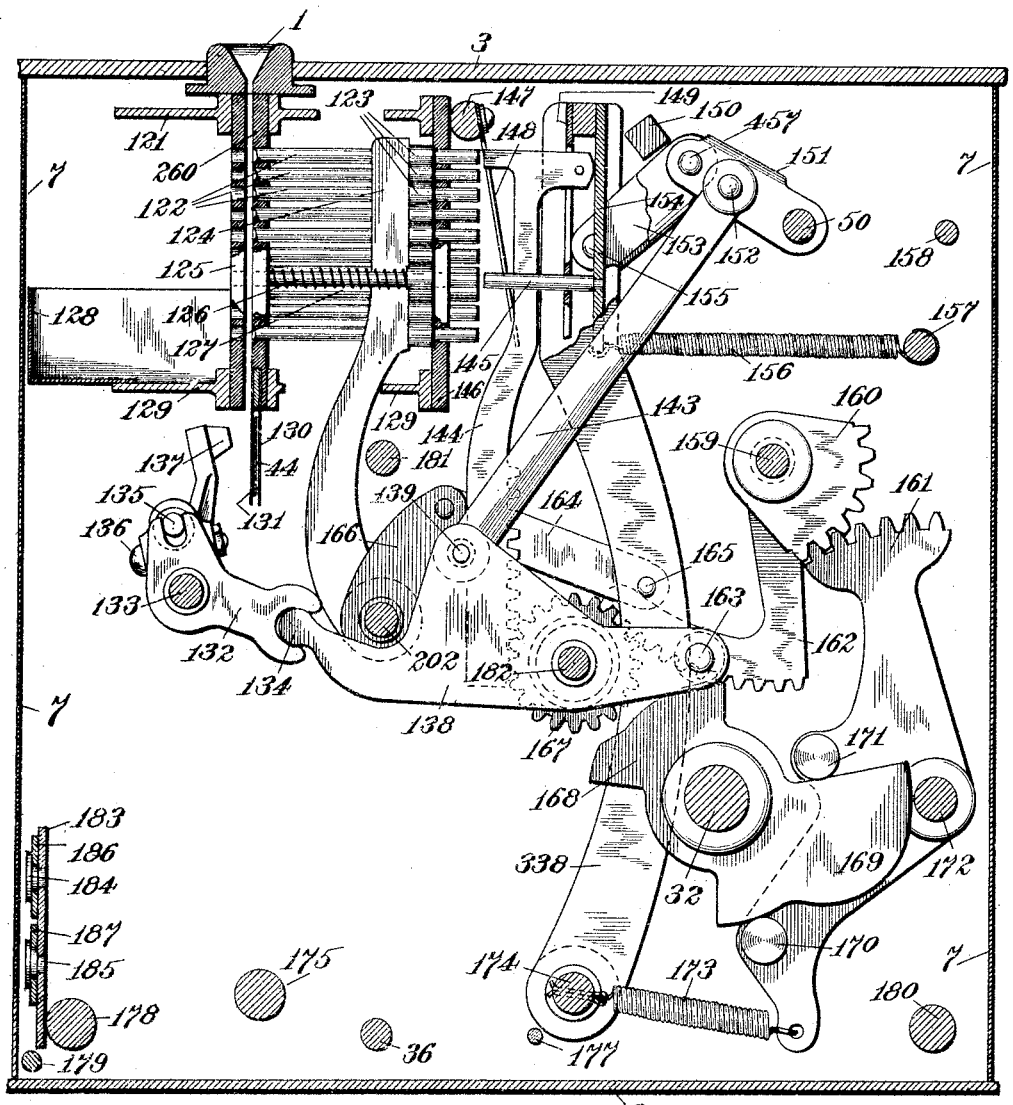
Figure 54:
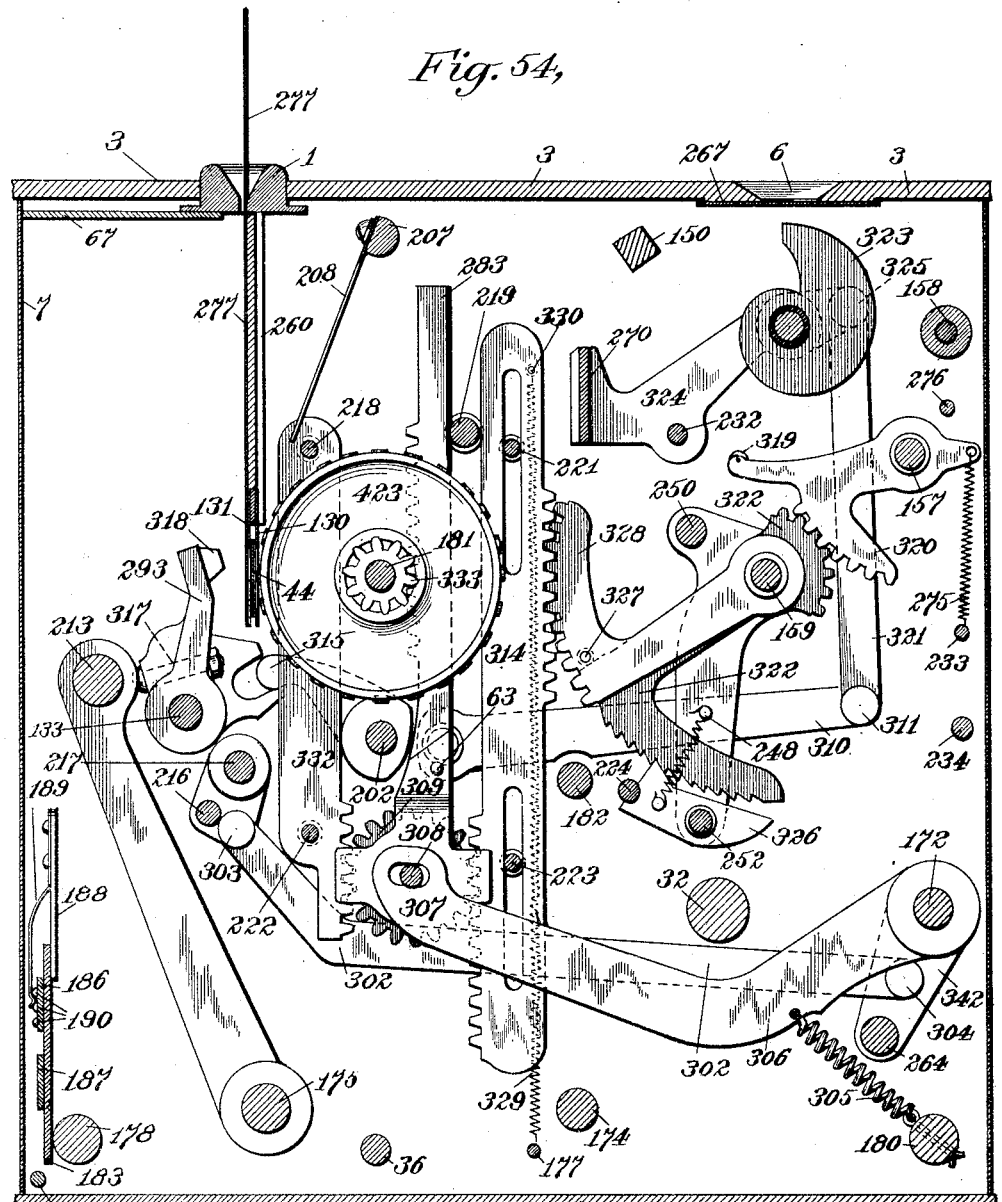

Referring to such specific embodiment, Figure 1 is a perspective view of the machine. Fig. 2 is a vertical section taken just inside the case on the lines 2—2 of Fig. 3. Fig. 3 is a top view of the machine with the cover plate removed, with the surrounding sheet metal casing in section. Fig. 4 is a detailed section of the dash-pot used to cushion the sudden movement of the armature of the electromagnet used for actuating the timing mechanism. Fig. 5 is a vertical section taken just inside of the case on the lines 5—5 of Fig. 3. It shows the impulse mechanism and its cushioning device. Fig. 6 is a vertical section on the lines 6—6 of Fig. 3 and shows the punch mechanism. Fig. 7 is a vertical section on the lines 7—7 of Fig. 3. It shows the type wheels and the timing mechanism by which they are controlled and the pin boxes. It is a side view of the "tenths" mechanism and Fig. 8 is a vertical section taken on the same line 7—7 of Fig. 3, but showing the position of the mechanism at the "out" operation with the handle 2 drawn forward toward the front of the machine as far as it will go, and with the parts as they stand at the time of printing. Fig. 9 is a vertical section on the lines 9—9 of Fig. 3. It shows the mechanism for cutting out the punching operation on the "out" operation of the machine and also the mechanism by which the hour wheel is set. Figs. 7 and 9 represent the "out" operation of the machine also, but with the handle 2 in its normal position. Fig. 10 is a horizontal section taken on the lines 10—10 of Figs. 6 and 9. Fig. 11 is a detailed view of the plate against which the record card rests when it is in the machine. Fig. 12 is a horizontal section taken on the lines 12—12 of Figs. 6 and 9. Fig. 13 is a detailed view of part of the operating mechanism for operating the type wheels. Fig. 14 is a detailed view of part of the punch selector mechanism showing how it is kept in place. Figs. 15 and 16 are views of the "units" pin boxes and subtracting and borrowing mechanism. Fig. 17 is a view of the "tens" pin box. Figs. 18–28 illustrate in detail the indicating wheels 404—407 and the timing mechanism. Figs. 29 and 30 illustrate the impulse mechanism in two different positions and Fig. 31 is a detailed view showing the arrangement of the impulse springs and is a section taken on the lines 31—31 of Fig. 5. Fig. 32 is a detailed view of the hook by which a positive rigid connection is established between the handle 2 of the machine and the main shaft 32. Figs. 33 and 34 are detailed views of one of the spring suspensions. Fig. 35 is a detailed side view of the "hour" floating rack and differential gear, the other time denominations of the machine being provided with similar racks and gears. Fig. 36 is a detailed section on the line 36—36 of Fig. 35. Fig. 37 is a detailed side view of the "tens" type wheel and shows the usual way in which the wheel is engraved. Fig. 38 is a detailed section and Fig. 39 an outside view of the mechanism for adjusting one of the printing pads. Figs. 40–42 are side views respectively of the "tenths", "units" and "tens" pin box racks and Fig. 43 is a side view of the hour stationary rack. Fig. 44 is a detailed side view of the worm by which the eccentric shown in Fig. 39 is fed around. Fig. 45 is a face view of the ink ribbon mechanism. Fig. 46 is a detailed view showing a modification of the "hour" train of mechanism. Fig. 47 is a detailed edge view of the crease in the ink ribbon for the purpose of shifting the feed. Fig. 48 is a face view of the card used in the machine. Fig. 49 is a view of the back of the card after "ringing in." Fig. 50 a detailed view of the face of the card after "ringing out." Fig. 51 is a view of a card illustrating how two records may be made on one card, if desired. Fig. 52 is a vertical section showing a modification of the punch mechanism. Fig. 53 is a view generally similar to Fig. 6 and Fig. 54 is a view generally similar to Fig. 7, but both omitting the cut-out mechanism for the punches and the connecting parts. Figs. 55 and 56 illustrate the card used in the mechanism of Figs. 53 and 54, Fig. 55 showing the back of the card after the first or "ringing in" operation and Fig. 56 showing the front of the card after the second or "ringing out" operation.

In order that the construction and operation of my improved machine, shown in the drawings, may be more readily understood, I will first describe, in a general way, the manner of its operation by an operator and the results accomplished by such operation and then, in a general way, how such results are obtained and then I will describe later on in detail the specific mechanism by which the results are obtained.

In operating my machine, the operator first inserts a suitable card, for example a card 277, of which a face view is shown in Fig. 48, into slot 1 of the machine. This card is inserted with the word "Start" at the top and facing the operator. He then pulls forward toward him the handle 2 of the machine as far as it will go and then releases it, the handle being automatically returned to its position. This operation is performed by the operator at the beginning of a first operation and will be spoken of as the "ringing in" operation. This operation causes to be printed upon the back of the card at the lower left-hand corner, as viewed from the front, where the operator stands, the time of the "ringing in" operation, or as it is phrased on the card "time connected". This appears upon the back of the card in spaces 426 and 427, as shown in Fig. 49 in the illustration of the operation of the machine, as shown in the drawings, as four hours, five minutes and eight-tenths of a minute A. M., or in other words, 5.8 minutes past 4 A. M. As the card is shown in Fig. 49 as reversed, these numbers appear at the upper left-hand corner in spaces 426 and 427 as 4 05.8. The machine illustrated gives a record of the time in hours, minutes and tenths of a minute. This "ringing in" operation has also caused to be punched in the card four holes, as shown in Fig. 49, hole 428 known as the detector hole, the purpose of which will be explained hereafter, and also holes 429, 430 and 431, hole 429 representing the tens of minutes, 430 the units of minutes and 431 the tenths of minutes. The location upon the card of these holes 429, 430 and 431 represents the same minutes and tenths of minutes printed at the top of the card in Fig. 49, namely, 5.8 of a minute, the hole 429 being at the zero point. After the telephonic communication or other operation, the length of time of which is to be recorded, has been completed, the operator takes the same card and inserts it in slot 1, but now with the back of the card before him and with the word "Finished" at the top. This operation we will speak of as the "ringing out" operation. After inserting the card in the slot, as above described, the operator again pulls handle 2 forward, as before, and releases it. This operation causes the elapsed time to be printed upon the side of the card away from the operator, namely, on the side marked "Start" in space 432 at the lower left-hand corner, as the card stands in the slot. In the illustration given in the drawings, this elapsed time is "07.4", representing the elapsed time as seven minutes and four-tenths of a minute between the first or "ringing in" operation or second or "ringing out" operation, as is illustrated in Fig. 50. In this particular embodiment of my invention shown in Fig. 50, the hour is not printed. As this particular form of my invention is especially designed to be used for short periods of time, as for example in recording the length of time of telephonic communications, the hour is not shown, although the hour may also be printed, if desired.

Referring still, in a general way, to the machine, although somewhat more in detail, the indicating and recording mechanism consists of a series of index or indicating wheels, the tenths wheel 404, the minute units wheel 405, the tens minute wheel 406, the hour wheel 407 (see Fig. 3) and the type wheels, the tenths wheel 245, the minute unit wheel 420, the tens minute wheel 421 and the hour wheel 423 (see Fig. 12). The index or indicating wheels 404—407 merely give a visual indication to the operator through opening 6 in the casing 3 of the machine, as shown in Fig. 7.

The type wheels 245, 420, 421 and 423 print upon the card at the proper times both the "in" time and the elapsed time. These type wheels stand normally at zero and are moved at each operation of the machine to indicate either the "in" time or the elapsed time. The index or indicating wheels 404—407 always represent the true time. They are controlled for this purpose, as shown, by a master-clock 18, which through a primary circuit containing the battery 17 and relay 15 and a secondary circuit containing battery 16 and electromagnet 61 causes these wheels to indicate the true time and also move the timing cams 254, 385, 403 and 323, which are respectively fast to their respective indicating wheels, and move these timing cams so that their relative positions indicate the true time in tenths of minutes, minutes and hours respectively (see Figs. 18–27). Suitable connecting mechanism is provided between these cams and the type wheels 245, 420, 421 and 423, so that at each operation of the machine the type wheels are moved into a position to correspond with the then position of the timing cams and thus cause the type upon these type wheels standing upon the printing line to indicate the true time. In the "in" operation of the machine the type thus brought upon the printing line prints the "in" time or "time connected" as it is phrased on the card of Fig. 49. Accordingly, the connecting mechanism preferably permits the type wheels to be wholly disconnected from the timing cams in the printing operation, so that no interference is had with the proper movement of the time cams to represent the true time, no matter how long a time the printing operation consumes. This also enables the type wheels, when next connected with the timing cams, to represent the true time at such subsequent operation. In the "out" or second operation, the type wheels after being moved to the position representing the time of that operation of the machine, are moved in a reverse direction a distance representing the time of the first or "in" operation of the machine, thus subtracting from the time of the second or "out" operation of the machine the time of the first or "in" operation, bringing upon the printing line the type upon these type wheels which represents the elapsed time between two operations, and after this is done, the elapsed time is printed upon the card. This subtracting operation is performed, in the machine shown, in the following manner. Four series of punches are provided. As shown in Fig. 3 and Fig. 6, a single punch 126 is provided to punch the detector hole 428 and three series of punches 122, one of ten punches to punch the tenths of minutes hole 431; another of ten punches to punch the units of minutes hole 430 and one of six punches to punch the tens of minutes hole 429. For each of these three series a selector is provided, 353 for the tenths punches, 352 for the units of minutes and 144 for the tens of minutes. The relative location of these selectors is controlled by the timing cams referred to above by substantially the same mechanism, at least in part, as that which controls the movement of the type wheels. At each operation of the machine these selectors are respectively moved opposite the punch representing the time in minutes and tenths of minutes of the operation of the machine. By appropriate mechanism, actuated from the main driving shaft 32 of the machine, the particular punch opposite each selector at that moment is operated to punch a hole in the card. The holes thus punched, shown in Fig. 48 as 429, 430 and 431, accordingly represent, by their location on the card, the time in minutes and tenths of minutes of an operation of the machine, as shown the "in" operation of the machine. In one form of my invention shown in the drawings, this punching apparatus is thrown out of operation on the "out" operation of the machine, and in another form, as shown in Figs. 53-56, it is shown as operated also on the "out" operation of the machine. A card illustrating such punching on the "out" operation is shown in Fig. 56. The holes punched in the scale opposite the words "time disconnected" on this card were thus punched. There are holes punched in this card representing both the "in" time or "time connected" and also the "out" time or "time disconnected." The card in this instance furnishes a check not only for the "in" time, but also for the "out" time. In this form of card, the hour also of the "out" operation is printed, as appears in Fig. 56.

The subtracting operation, above referred to, upon the type wheels, is accomplished by means of the holes 429, 430 and 431 punched in the card as representing the time of the "in" operation. This is done by means of pin boxes containing a series of pins 209 adapted, if permitted, to pass through holes punched in the card and to project into the path of racks 205 (Figs. 7 and 8) representing the tenths type wheel 245, 279 representing the units or minutes wheel 420 and 280 representing the tens of minutes type wheel 421. It will, of course, be understood that only those pins will project into the path of the said racks which are opposite to holes previously punched in the card; in other words, that are opposite the holes 429, 430 or 431 punched to represent the "in" time. The racks 205, 279 and 280, at each operation of the machine, are permitted to fall until arrested by a pin 209. The extent of their downward movement will thus be determined by the holes punched in the card; or in other words, the extent of their downward movement will be dependent upon the time of the "in" operation of the machine. By suitable connections this movement is imparted to the respective type wheels and causes them to move in the reverse direction to that in which they were moved by the timing cams. In other words, the type wheels on the "out" operation of the machine are moved through the agency of the timing cams to a position to indicate the true time of the second or "out" operation and are then moved in the reverse direction a distance representing the time of the "in" operation of the machine. This subtracts the "in" time from the "out" time, leaving upon the printing line of the respective wheels the type representing the elapsed time between the two operations. It will be understood, of course, that this operation does not take place on the "in" or first operation of the machine, as there are then no holes punched in the card and the pins 209 are, accordingly, not operative to check the downward movement of the racks 205, 279 and 280. Suitable devices are provided for borrowing one in this subtracting operation, whenever necessary, as will be described later on.

The various parts of the mechanism, other than the timing cams and index or indicating wheels 404—407 which are moved or controlled by the master clock, are moved or operated by means of a main driving shaft 32, as will be presently described. This main driving shaft is operated preferably by an impulse mechanism connected between the operating means or handle 2 of the machine and the main shaft 32, especially illustrated in Figs. 5, 29 and 30. By means of this impulse mechanism, a flexible or yielding impulse or connection is given by handle 2 to the main driving shaft 32 during a part of the operation when the lighter or more delicate work is being performed, such as the setting of the type wheels and the punching devices and pin boxes, and a rigid impulse or connection is given during the heavier and less delicate work, such as the actual punching and printing operations, and suitable means are provided for retarding or preventing the too rapid operation of the shaft, all of which will be described in detail later on.

The detector hole 428 is punched on the first operation of the machine and has for its object to throw the punching mechanism out of operative connection with the main driving shaft 32 upon the second or "out"

operation. Of course, where it is desired to punch the "out" time in the second operation, as shown in the card at Fig. 56, the detector hole and its punching mechanism are omitted.

I will now proceed to describe in detail the various parts of the machine.

Part of the mechanism is controlled or driven by the master clock and the remaining parts are controlled or operated by the operator through the movement of the handle 2. I will first describe the clock controlled mechanism.

*Clock controlled drive mechanism.*—This is particularly illustrated in Figs. 2, 3, 4, 7, 8, 9 and 18–28. 18 (see Fig. 2) is the master clock. This clock is connected in circuit with a battery 17 and a relay 15, by means of wires 24, 25 and 26. In the particular illustration shown, this is arranged in the usual way so as to make and break the circuit through relay 15 every tenth of a minute. The relay 15 of this primary circuit controls its armature 459 adapted to be retracted by a spring 460 against a stop 461 in the usual way. When relay 15 attracts its armature 459, the latter closes at its forward contact 462 the circuit, whose battery is 16. This circuit is as follows. Starting from one side of the battery it runs through wire 20, armature 459, contact point 462, wire 21 to contact strip 12 mounted on insulating block 11, wire 463 running through cable 10, binding post 464, thence through one of the wires 58 to one side of electro-magnet 61, thence back through the other wire 58 to binding post 465, wire 466, running through cable 10 back to the other contact strip 12 on insulating block 11, wires 467 and 19 back to battery. 13 is a condenser of the ordinary type connected to the circuit by wires 22 and 23, as shown, to prevent sparking at the contact points of the relay. Wires 14 are connected with wires 19 and 20 and are intended to connect with another recording device, such as is shown in the drawings herein, if it is desired to operate another recorder synchronously with the time recorder shown and described herein. Such another synchronous recorder is not shown herein as it may be in all respects like the one shown and also as the operation of two or more such machines synchronously with one another forms no part of the present invention and is to be covered in another application to be filed hereafter. Binding posts 464 and 465 are mounted on insulating block 28.

Electro-magnet 61 is fastened to the side frame 66 of the machine by bracket 62. Its armature 60 is pivoted to the side frame at the point 59 upon a stud and is held in place by the split pin, as shown. A downwardly projecting piece 65 is fastened to the armature and carries a pin 64, which enters a slot in the short lever 468 fastened to the stud shaft 63. On the other end of this stud shaft 63 is fastened a lever 310 (see Fig. 9) having at its outer end a pivot 311, to which is connected link 321. This link is connected at its upper end at 325 to the side plate 324, which is mounted so as to rotate freely on shaft 50 fast in the side frame of the machine. At each impulse of the master clock, i. e., at each tenth of a minute, link 321 is pulled downward, as viewed in Fig. 9 and side plate 324 is rocked on shaft 50, the left-hand end of side plate 324 being moved upward a short distance for a purpose presently to be described.

On the outer end of shaft 50, see Fig. 2, is mounted a plate 52, which is provided at its right-hand end, as viewed in Fig. 2, with a slot 53. Rod 232, secured to side plate 324, carries a number of feeding pawls 269, 389, 390 and 393 for feeding forward the index wheels 404, 405, 406 and 407, as will be presently described. This rod 232 has an outwardly extending end marked 51, which works in the slot 53 of plate 52, see Fig. 2. Mounted fast with plate 52 is a short lever 54 and pivoted to its outer end is the upper end of piston rod 55 carrying a piston 71 at its lower end, see Fig. 4, working in a dash-pot cylinder 56. This cylinder is supplied with oil, or other suitable liquid which is permitted to pass through hole 70 drilled in piston 71.

68 is a screw-threaded cylinder head forming a guide for piston rod 55 and preventing the escape of oil from the cylinder. Depressions 69 in its upper surface are for the purpose of facilitating its removal. The lower part of cylinder 56 is secured to the side frame 66 by stud 57, passing through hole 469 in the frame of the cylinder. Stud 57 works freely in this hole so as to allow a slight oscillation of the cylinder made necessary by the angular throw of lever 54 and piston rod 55. The purpose of cylinder 56 and its connections is to retard or cushion the stroke of armature 60, magnet 61 and its connecting parts to prevent jars.

The feeding of the index or indicating wheels 404–407 is illustrated in Figs. 18–28. Fig. 18 shows a top view of these indicating wheels and the mechanism by which they are fed to indicate always the true time as given by impulses of master clock 18 and they also show the timing cams 254, 385, 403 and 323. These timing cams are fast with the indicating wheels and their positions at any time represent the time-of-day. They are used for the purpose of setting the time recording mechanism, as will be presently described. Fig. 19 represents a side view of the tenths of minutes indicating wheel 404, the ratchet 266 by which it is fed forward, the pawl 269 on shaft 232 which engages with the ratchet 266 and feeds it forward, a disk 397 fast with ratchet 266 and of exactly the same construction as the disk 394, Fig. 24. It is provided with a notch similar to the notch 395 in disk 394. Also fast with ratchet 266 is the timing cam 254. It will be observed that the tenths of minutes indicating wheel 404, the tenths of minutes timing cam 254, the ratchet 266 and disk 397 are all fast together and are all loose on shaft 50. Each indicating wheel is similarly provided with a ratchet, disk and timing cam all fast together, with the exception of the hour wheel. Fig. 20 is a side view of the units indicating wheel 405 with its timing cam 385, ratchet 399 and disk 398 and pawl 389 on shaft 232. Pawl 269 is kept in engagement in the teeth of ratchet wheel by spring 271, secured to cross-plate 270, fast to plate 324. Similarly, pawl 389 is connected to the same plate 270 by spring 386. Fig. 21 shows the tens of minutes indicating wheel 406, with its timing cam 403, ratchet 401, disk 400 and spring 387. The reason for the double cam is simply because the ratchet 401 has twelve teeth, while the indicating wheel 406 is numbered zero to five twice and the cam must, therefore, have two rises, as it makes a complete revolution only once in two hours. The pawl for driving this wheel is marked 390 and is shown in detail in Figs. 25, 26 and 27. At the end of the bushing 501 bearing this pawl 390 is a finger or wiper 396, which rests on the disk 398 of the next lower or units wheel 405. A projection 391 is so arranged on finger 396 that the projection 391 will rest on the driving pawl 389 of the units wheel. This arrangement prevents pawl 390 from dropping into engagement with its ratchet wheel 401 until the next lower wheel, the units wheel, has moved up to the zero position, or in other words, has made a complete revolution, whereupon finger 396 will drop into the notch 395 of disk 398, permitting pawl 390 to drop into engagement with ratchet 401. At the next operation of rod 232 and strut 270 upon the next impulse of the master clock, the tens wheel will be fed forward one point, or in other words, one will be carried forward from the units wheel to the tens wheel. A similar arrangement is provided with all of the indicating wheels except that the hour indicating wheel, shown in Fig. 22, is not provided with a notched disk, as there is no wheel of higher denomination to which it carries. The hour indicating wheel is wheel 407, cam 323 and its ratchet 402. By these means, the index or indicating wheels and the timing cams are fed forward by the impulse of master clock 18 and always represent the true time.

The springs 271, 386, 387 and 388 which keep the pawls 269, 389, 390 and 393 in engagement with their respective disks are secured to cross-plate or strut 270. This cross-plate is secured on one side to plate 324 and on the other to plate 382, the plates 324 and 382 being mounted loosely on shaft 50.

150, see Fig. 7, is a square stop bar against which pawls 269, 389, etc., strike in order to prevent the indicating wheels from being fed too far. As all of these pawls, except the tenths pawl 269, may occupy either one of two positions, depending upon whether their finger is in the notch of the disk or bear upon the other parts of the periphery of the disk, I preferably provide each pawl with a notch 383 and surface 384, see Fig. 19, one or the other of which will strike the stop bar 150. As these pawls strike against the bar 150 they are forced inward and jammed between the bar and the tooth of the ratchet wheel and thus prevent excessive movement on the part of the wheel. While the tenths pawl 269, of course, only occupies one position for the sake of uniformity of parts, I have shown it as made in exactly the same form as the other pawls, except that it is not provided with the finger 396. This pawl is shown in side and edge view in Figs. 23 and 28.

In Figs. 18–22 inclusive, the parts are shown in the correct position to set the recording mechanism at 4.13.2, the time illustrated as that of the "out" operation of the machine, illustrated in the drawings.

*Impulse mechanism.*—This is especially illustrated in Figs. 1, 3, 5, 10, 12 and 29 to 32. I preferably provide an impulse mechanism for transmitting motion from the operating means, as shown, a handle 2, to the recording mechanism of the machine, as shown, the type wheels 245, etc., which print the time-of-day or the elapsed time, and the punches 122, which punch holes in the card representing the time of the "in" operation, which impulse mechanism will, at one part of the operation, preferably the earlier part, transmit such motion in a yielding or flexible manner in order to perform the lighter and more delicate operation, such as the setting of the type wheels and the punches in proper position for recording, and at another part of the operation, preferably the later part, will transmit such motion in a rigid manner to perform the heavier or less delicate operations, such as the actual printing or the punching. In the form of my invention shown in the drawings, I accomplish this by causing movement in the earlier part of the operation to be imparted from the handle to the main driving shaft 32 through springs 93, 93 and in the later part of the operation by a rigid connection. The details of this are as follows. Handle 2 is fastened to a short shaft 5 mounted in housing 4, see Figs. 1 and 5. Fast on shaft 5 is pinion 72 meshing with toothed sector 73, pivoted at 74 between side frame 68 and bracket 75. 81 is an arm integral with sector 73 and has connected to it, at 82, four tension springs 93, 93, 92 and 408. The lower end of springs 92 and 408 are fastened to stud 96 secured in the side frame 68. These two springs merely serve to return arm 81 and its connecting parts, including handle 2, to their original positions at the close of the operation. The two springs 93 are secured at their lower end to a casting 95 fast on main driving shaft 32. The object of these two springs is to impart movement to the main driving shaft upon which various cams are situated which drive different parts of the mechanism. In the operation of the machine, the handle 2 is pulled forward, as shown in Fig. 1, rotating pinion 72 and sector 73 and arm 81, as indicated by the arrows in Fig. 5, stretching all of the springs and through the two springs 93 tending to rock shaft 32, as shown by the arrow in Fig. 5. In order to prevent jars and a too sudden operation of parts of the mechanism, I preferably provide retarding means for that purpose. Of course, any suitable means may be provided. As shown, casting 95 has an arm 94 integral with it, pivoted at 118 to the casing of dash-pot 115 and tending to pull the casing downward on piston rod 111, as shaft 32 rocks. Piston rod 111 of the dash-pot is pivoted at 108 to the side frame 68 and carries at its lower end piston 470, provided with two holes 116 and 117. One of these holes, 116, has a valve 114 which opens the hole on the forward stroke of handle 2 and closes it upon the return stroke, thus slightly varying the cushioning effect in the two cases.

113 is an umbrella to prevent the oil from impinging too strongly upon the inside of cover 112 of the dash-pot to prevent leakage. 119 is a small pin provided to keep valve 114 in place. The effect of the dash-pot is, of course, to retard the movement of shaft 32 and prevent excessive speed either on the forward or return movement of the parts and thus avoid sudden jars or shocks to the mechanism and to make the mechanism run more smoothly and with a more regular motion.

It will be seen from the above that when the handle 2 is pulled forward motion is imparted to shaft 32 only through springs 93, thus giving a yielding or flexible connection. Also that shaft 32 is retarded in its movement and cannot respond to the pull of the springs faster than at a certain prescribed rate. Of course, it will be understood that by varying the number or size of the holes in the piston of the dash-pot, this speed can be regulated in the usual way. As a result of the above described flexible impulse connection, shaft 32 will start more slowly and will proceed with a more uniform motion in the early part of its movement. This is important for moving those parts of the mechanism which perform the lighter or more delicate work, such for instance as the setting of the type wheels into the proper position to print or the setting of the punch-selecting devices. It will be understood from the above that handle 2 and its connections, including arm 81, may move at first more rapidly than casting 95 and shaft 32, springs 93 being stretched in the operation. These springs will, of course, in time retract and move casting 95 forward to overtake the movement of arm 81.

When the lighter operations have been performed and the heavier work, such as the actual operation of the printing hammers or the punching of holes in the card is to be performed, I prefer to have a rigid connection between the operating means and shaft 32. This I accomplish as follows: Connecting arm 81 with casting 95 is a link 83 pivoted to the casting at 97 and having a slot 86, through which projects a pin 87 from arm 81. Pivoted to pin 87 is a hook-piece 88 having at its lower end a hook 412 on one side and a hook 411 on the other. 91 is a block fast on the back of link 83. It is indicated in dotted lines in Fig. 5 and is shown in full lines in Fig. 31. This Fig. 31 is a section on the lines 31—31 of Fig. 5 and shows a cross-section of the springs 93, 93, 92 and 408 and also of the hook piece 88, link 83 and block 91. In the first upward movement of arm 81, pin 87 slipping loosely in slot 86, exerts no upward pull on link 83. Hook piece 88, however, is pulled upward by arm 81, to which it is pivoted until hook 412 engages a projecting pin 84 secured to the framework. The angular relation of the hook piece 88 and the pin 84 is such that the hook 412 would be forced off the pin 84, but for the fact that hook piece 88, which is in the same plane as block 91, is against block 91. In this position of parts the upward movement of arm 81 and hook piece 88 is momentarily arrested. Shortly thereafter, however, springs 93, in retracting, pull forward casting 95 and with it link 83 until the lower part of block 91 passes hook 411 of hook piece 88, whereupon the hook piece 88 is forced to the right, as viewed in Fig. 5 and hook 411 catches under the lower left-hand corner of block 91. A further upward movement of arm 81 causes casting 95 to rise upward, further rocking shaft 32 and this movement is transmitted, not through the springs, but through the rigid connection, consisting of hook piece 88, its hook 411, block 91 and link 83. The connection is now a rigid and unyielding one and the further rocking of shaft 32 is accomplished through this rigid connection with the operating handle 2. During this rigid connection, the heavier parts of the work are performed, such as the printing and the punching. At the close of the operation, the springs 92 and 408 return arm 81 and its connecting parts, including handle 2, to their original positions and this movement through link 83 returns casting 95, shaft 32 and their connections to their original positions.

The time recording mechanism shown in the drawings consists of two kinds, namely, first, type wheels 245, 420, 421 and 423 which print either the time-of-day, i. e., the time of operation of the machine or the elapsed time between two operations of the machine and second, punching mechanism for punching in a card or other suitable record holes or other marks representing the time of the operation of the machine. Both of these forms of recording mechanism are controlled by timing mechanism controlled by the master clock, namely, from the timing cams 254, 385, 403 and 323 previously described. The type wheels 245, etc., are also controlled or moved in the reverse direction for subtracting purposes in accordance with the time of a prior operation of the machine and, as shown, this control is effected by means of time holes punched in a card, as will be presently described, the result of the operation upon the type wheels being to subtract the time of a prior operation of the machine from that of a subsequent operation and to give the elapsed time between the two operations. I will first describe these elapsed time type wheels 245, etc., and their control by the timing cams.

*The time type wheels and their control by the timing cams.*—This mechanism is especially illustrated in Figs. 3, 7, 8, 9, 10, 12, 13, 15, 16, 35, 36, 37 and 40 to 43 inclusive. Between the timing cams 254, 385, 403 and 323 and the type wheels 245, 420, 421 and 423 I preferably place intermediate actuating means actuated by and whose position is dependent upon, the timing cams, also driving means for the actuators which preferably have always the same extent of stroke and also differential mechanism for operating the type wheels in one direction or the other. Each type wheel has a corresponding cam. That of type wheel 245 is cam 254. As the connecting mechanism between the cams and the type wheels is the same for each cam and type wheel and its corresponding type wheel, I will describe this mechanism in connection with cams 254 and type wheel 245, it being understood that the connecting mechanism between each other timing cam and its wheel is exactly similar. In Fig. 7, timing cam 254 is shown as standing at the position represented by the figure 2, this representing two-tenths of a minute. The minute actuating means consists of a wiper 256, loosely pivoted on the stationary shaft 157, along with the other wipers and having a roller 255 bearing upon the surface of cam 254.

Wiper 256 is provided with gear teeth 471, which mesh with gear teeth 472 on a sector ratchet piece 246, loosely mounted on shaft 159. Sector ratchet piece 246 has a series of ratchet teeth 473 at its lower end. It is evident that the position of the sector 246 and its ratchet teeth 473 will be dependent upon the position of the timing cam 254. Piece 246 constitutes the actuator between the timing cam 254 and type wheel 245. This actuator is operated through driving mechanism which preferably has always the same extent of movement or stroke. This driving mechanism consists of a frame composed of two arms 247, 247 (see Figs. 12 and 13) connected by a universal bar 250, the two arms 247, 247 being mounted fast on shaft 159. The two arms 247, 247 are also connected by the small rod 248 and shaft 252, upon which are mounted loosely pawls 251, 515, 516 and 326, there being one of these pawls for each sector ratchet like 246. Springs 253, 365 and 312 serve to keep the pawls 251, etc., in engagement with their respective ratchets 473 on ratchet sectors 246, etc., spring 365, shown in Fig. 13, serving to keep the two intermediate pawls 515 and 516 in place by means of the loosely fitted bar 366. Shaft 159 is rocked at each rocking of main shaft 32 (see Fig. 6) by means of cam 169 engaging roller 170 on sector lever 161 loosely pivoted on shaft 172, the teeth on sector 161 engaging teeth on sector 160 fast on shaft 159. The roller 171, on sector 161, is for the purpose of positively returning the parts to their normal position on the return of shaft 32.

A movement of shaft 159 rocks frame 247, carrying with it the pawls 251, 515, 516 and 326, moving them toward the left, as viewed in Fig. 7. Preferably, and as shown in the drawings, this movement is always of the same extent. At the right-hand end of this movement the pawls strike a bar 234, rocking them and disengaging the pawl point at the left-hand side of the pawls from the teeth 473 of sector 246. In all other positions of the pawls, the springs 253, 365 and 312 hold the tooth at the left-hand end of each of the pawls in engagement with the teeth 473 of the sectors. In this position of the parts, and as the frame 247 sweeps to the left, as shown in Fig. 7, each pawl moves its corresponding sector to the left a distance corresponding with the leftward movement of the pawl. In this movement, the particular ratchet tooth of the ratchet 473, with which the pawl will engage, will depend upon the position of the sector 246, and as previously explained, this will depend upon the position of the corresponding timing cam. In the position of the parts shown in Fig. 7, pawl 251 when released from bar 234, will engage with the second tooth of ratchet 473 as timing cam 254 stands at its second position, or in other words, the position representing two-tenths of a minute. When the cam has been further advanced, as for instance to the position where it represents .9, pawl 251, when released by bar 234, will engage with the ninth tooth. It will thus be understood that the left-hand end of sector 246 will be moved to the left a distance depending upon its initial position at the moment pawl 251 engages with it. It is then moved to the left the full distance that pawl 251 is moved. In the course of this movement it will engage pin 272 on gear sector 176 and will rotate that sector, which is mounted loosely on shaft 159. This movement to the left is limited by stop rod 224, with which the nose of the pawl 251 comes into engagement. It will be understood that with the timing cam at zero the left-hand end of sector 246 will be just nine points removed from pin 272 and the extent of movement of the sector 176 will depend upon what tooth of the ratchet 473 pawl 251 engages with when released and this is determined by the position of the timing cam, as previously explained. This movement of the parts will rotate the wiper 256, removing its roller 255 from contact with the cam 254. As the extent of this movement is nine points, the roller will be entirely removed from the path of the cam 254. In this position, the timing cam can rotate for any length of time without being interfered with by the wiper or its connecting parts. Accordingly, it is of no consequence how long the wiper and its connecting parts, including the type wheels 245, etc., as will be presently described, are kept in this position. The timing cam will, meanwhile, rotate under the control of the master clock unaffected by such parts. Accordingly, any length of time desired may be employed in the setting up and printing and punching operations without interfering with the operation or accuracy of the timing cams. They will always represent the true time. And whenever the wipers are returned to position, they and the sectors 246, etc., which they control will always be in a position representing such true time.

Gear teeth 474 on sector 176 mesh with the gear teeth 475 on the time-of-day rack 235. This rack is guided by the two guide rods 221 and 223 projecting from the side frames of the machine through slots 505 and 506 in rack 235. These rods, of course, project through corresponding slots in all of the other time-of-day racks. The slots are long enough to permit rack 235 to move up a distance corresponding to nine units and to do this in a perfectly straight line. Rack 235 is normally kept in its lowermost position by a light tension spring 265, fast at its upper end to small pin 234, riveted into the rack and at its lower end to rod 177 fast in the side frames of the machine. A series of teeth 476 are cut in the opposite edge of the rack at its lower end and these teeth engage with a floating pinion or differential gear-wheel 238. The differential gear wheel also meshes with another rack 205, which is used for subtracting purposes, as will be presently described. This subtracting rack 305 is similarly mounted, being provided with slots 507 and 508, through which pass guide rods 218 and 222. It will be understood, of course, that a differential gear is provided for each time-of-day rack and a subtraction rack for each differential gear. 208 are teeth of a comb projecting between the subtracting racks to insure proper alinement laterally, these teeth being fast to a supporting strut 207 secured to the framework.

It will be understood, of course, that a differential gear is provided for each of the type wheels 245, 420, 421 and 423, like differential gear 238. These gear wheels are numbered 238, 517, 518 and 309 respectively, see Fig. 8. The construction of these differential gear wheels and their connections is shown in greater detail in Figs. 35 and 36. Secured to each of these differential gears is a differential rack. The racks are numbered 220, 281, 282 and 283 respectively. The particular differential gear and rack shown in Figs. 35 and 36 are the hour differential gear 309 and rack 283 and the others are constructed in exactly the same manner, with the exception of the borrowing mechanism, which will be described later on. Rack 283 is provided at its lower end with a slight off-set 477, into which a shouldered stud 417 is driven. Mounted freely on this stud is the hour differential 309. A cover plate 416, also provided with an of-set 478, is riveted to the rack by rivet 419. Both the rack itself and the cover plate 416 are provided with outwardly extending ears 479, between which the hour subtracting rack 332 and the hour time-of-day rack 314 work freely. This construction keeps the differential gear firmly in mesh with both of these racks at all times. A hole 418 is drilled through the center of stud 417 to receive the rivet 308, by which the lever 306 is attached to the rack 283.

This lever 306 corresponds in the hour arrangement to the lever 237 in the tenths of units mechanism, shown in Fig. 7. The purpose of these levers and the corresponding levers 340 and 339 of the units and tens of minutes mechanism is to exert a strong downward pull on the differential racks 220, 281, 282 and 283 respectively. For this purpose, a tension spring is provided for each lever, that for lever 237 is numbered 229 and is shown in Fig. 7. In the normal position of the parts, the type wheels stand at zero, the time-of-day racks 235, etc., are in their lowermost position, the subtracting racks 205, etc., are in their highest position and the differentials and the differential racks stand at the zero position.

The differential racks 220, 281, 282 and 283 are each provided with a series of teeth 480 which are in mesh with a pinion 244 fast to its corresponding type wheel. Each type wheel and its pinion are loose on shaft 181. Accordingly, as a differential gear and its rack rise or fall, its corresponding type wheel will be rotated one way or the other. The type on the type wheel are so arranged that as the differential rack rises it will tend to add on the wheel, that is, to rotate it from zero to one, one to two, etc., and as the differential gear and rack fall it will move the type wheel in the reverse direction or will subtract upon it, moving it from zero to nine, eight, seven, etc.

219 is a guide bar for holding the differential racks in proper vertical alinement.

It will now be understood that as the pawls 251, etc., force sector ratchets 246 to the left, as viewed in Fig. 7, and as the latter strike pins 272 and force the sectors 176 to the left, the teeth 474 of the latter engaging with the teeth 475 of the time-of-day rack 235, etc., will force those racks upward, to exactly the same extent as the units of time represented by the corresponding timing cams. Through teeth 476 on the time-of-day rack the differential gear 238 will be rotated and as subtraction rack 205 remains staationary, the differential gear will roll upward on the teeth 481 of that rack, raising the differential rack 220 and through teeth 480 and pinion 244 rotating type wheel 245 to the left, as viewed in Fig. 7. This will bring upon the printing line, opposite printing hammer 137, type representing the unit of time represented by the position at that time of timing cam 254. In this way the type wheels are set at the time-of-day representing the operation of the machine. When the printing hammers are operated, as will be described hereafter, that time is printed upon the card inserted in the slot. As the wipers are at this time entirely removed from the path of the timing cam, as illustrated in Fig. 8, it makes no difference how long a time is spent in the printing operation. The timing cams are meanwhile free to rotate as controlled by the clock movement, as already described. In connection with these timing cams and their corresponding parts, each is provided with a pawl 285 loosely mounted on rod 158 and engaging with one of the teeth of ratchet 266 a spring 274 secured to each pawl and to a rod 276 holding the pawls in engagement with the ratchets. This is to prevent backward rotation of the timing cams, index wheel and connecting parts.

In Fig. 7 the parts are shown as at zero, except the tenth indicating wheel and its timing cam, wiper and ratchet sector 246. In Fig. 8 the parts are shown with the mechanism set at the "out" time, as in the example illustrated in the drawings, namely, at 4.13.2 o'clock.

It will be understood that the sector ratchets 246 and 363 representing the tenths and units of minutes are provided with ten teeth and the sector 364 of the tens of minutes with six teeth and the sector 332 of the hours with twelve teeth.

The means for subtracting from the type wheels 245, etc., so as to obtain the elapsed time between two operations of the machine will be presently described. I will first, however, describe the apparatus by means of which a record of the time of an operation of the machine, as for example the time of the commencement of a telephonic communication, is recorded upon the card by means of holes punched in the card, the location of the holes on the card representing the time of the operation of the machine.

*The punching mechanism and connections.*—This is especially illustrated in Figs. 3, 6, 10, 11, 12, 13, 14 and 52. In my improved machine a record of the time of the operation of the machine is also made by punching holes in a card, the location of the holes indicating the time of such operation. Preferably I employ a method of recording only at the first or "in" operation, as for example at the commencement of a telephonic communication, although if desired, such a record may be made at every operation of the machine and I have illustrated this in Figs. 53–56. Any suitable punching mechanism may be employed. In Fig. 6 and other figures I have shown punches 122 which do not move except in the actual punching operation, in this case a series of punches being provided for each division of time, ten punches for the tenths and units of minutes, six for the tens of minutes. In this case, punch selecting devices, controlled by the timing cams, are controlled for selecting the particular punch in each series to be operated.

144 is the punch selector for the tenths of minutes, 352 that for the units and 353 for the tens of minutes. In this form of my invention, the location of the punch holes in the card depends upon the position of the selector. In Fig. 52 I have shown a form of punch 443, carried by a movable frame 455, in which a single punch is moved, in accordance with the position of its corresponding time cam. Either form may be employed, as desired.

Referring now to the forms shown in Fig.

6 and other figures, the punches 122 are steel rods mounted in two guide plates 146 and 260 and each is fitted with a collar 123. The punches work easily in the guide plates. A die plate 125 is also arranged at one side of the card slot 1, as shown in Fig. 6. Die plate 125 is provided with holes registering with those in guide or stripper plate 260. Fig. 11 is a face view of guide plate 260. The holes opposite the punches are numbered 336, there being ten holes in the tenths and units of minutes and six in the tens of minutes.

482 is the hole for guiding the punch 126 (see Fig. 6) which makes the detector hole in the record card. The levers 124 are provided in order to return the punches to their normal position. These are operated by the punch operating mechanism, as will be presently described. Punch 126 for making the detector hole is returned to its normal position by means of the compression spring 127 spirally encircling the punch and compressed between its collar 123 and stripper plate 260.

The punch selectors are controlled in their selecting movement by the timing cams 254, etc. Where a single punch is used for each division of time, as illustrated in Fig. 52, such a punch is controlled in its movement by the timing cam. Any suitable connections may be provided between the timing cams and the punch selectors or movable punches. In the drawings, I have shown the punch selectors 144, 352 and 353 as operated from the sectors 176, 355 and 356, already described, as operating the time-of-day racks 235, 359 and 360, see Figs. 6, 7, 12 and 13. This is accomplished by means of cross-covers from the sectors just named to sectors 349, 348 and 162, which mesh with pinions 351, 350 and 167 respectively, these latter meshing with their respective punch selectors 353, 352 and 144 respectively. Each sector 176, 355 and 356 has fast to it a crossover piece 257, 258 and 259 respectively, shown in plan view in Fig. 12 and in cross-section in Fig. 7. These cross-overs connect respectively with sectors 349, 348 and 162 loosely mounted on shaft 159. In Fig. 6 the sector 162 of the tens of minutes punch selector is shown. The sector has teeth 483 meshing with a pinion 167 loose on shaft 182, which pinion also meshes with the teeth 484 of the tens punch selector 144. In the same manner the other sectors 348 and 349 mesh with similar pinions 350 and 351, which respectively mesh with similar rack teeth on punch selectors 352 and 353. Accordingly, the same extent of movement that is imparted to the sectors 176, 355 and 356 respectively to move the time-of-day racks 235, 359 and 360 to add on their type wheels 245, 420 and 421 respectively is also imparted to the corresponding punch selector racks 353, 352 and 144. This brings the nose 485 of each punch selector rack opposite the particular punch in its series which represents the same unit of time represented by the position of its corresponding timing cam. It will be understood that the punch selectors normally stand at their uppermost or zero position and are moved to the position representing the time-of-day of the operation by the wipers, sectors, cross-overs, pawls 251 and the toothed sectors 246, etc., already described, this bringing them to the position representing the time-of-day. The punching devices are now in position to be operated to punch holes in the card representing the time-of-day of the operation.

In order to keep the rack 484 of each punch selector in mesh with its spur gear, I preferably provide a piece of sheet metal 354, see Fig. 12, provided with slots for the various racks and also provided with springs 368 (see Fig. 14). The sheet metal piece 354 is supported by the boss 367 fast to shaft 182. In order to keep the punch selectors in exact line with the punches, I preferably provide a comb 148, fastened at the top to a rod 147 (see Fig. 6). Another comb 149 is provided. This guides the selectors in a vertical movement and keeps them in alinement with the punches, but also keeps them from actually coming into contact with such punches until the proper times for such contact arises. The comb 149 has slits 486, through which a backward projection 487 of the punch selector at its top projects and a pin 503, secured to this projection, stands sidewise to prevent the forward movement of the punch selector until operated, as presently to be described (see Figs. 3 and 6). The punch guide plates 260 and 125 are held in place at the top by the casting 121 and at the bottom by the casting 129. These castings are fastened to the side frame 68, see Fig. 3.

The means shown for operating the punch selectors are as follows: A shaft 174 extends across the machine and is fast in both side frames 66 and 68. Loosely mounted on this shaft are the two upright lever arms 338 (see Figs. 6, 3, 10 and 12). Extending between them, at their upper ends and rigidly connected to them, is the punch operating plate 154, against which abut the rear projections 487 of the punch selectors. Operating plate 154 is given a forward and backward movement in the operation of the handle 2 of the machine, as will be presently described, and this forces the punch selectors forward and nose 485 of each selector striking its appropriate punch 122 and forcing it through any card that may be in slot 1. To force plate 154 forward or to the left, as viewed in Fig. 6, I preferably employ a toggle lever arrangement, of which 153 is one part and 151 is the other. Part 153 consists of two arms, each pivoted at 155 to each of the upright levers 338. Part 151 consists of two arms freely pivoted on shaft 50 and at its other end is pivoted at 457 to the part 153. This whole arrangement constitutes a toggle frame for forcing plate 154 forward. The toggle is operated through a link 143, secured to part 151 at 152. This link has a slot 489 at its lower end, in which at 140 is pivoted the upper end of lever 141 fast on shaft 142. Slightly farther upon link 143 is an L-shaped opening 488, through which extends an operating pin 139 fast to lever 138, the latter loosely pivoted on shaft 182. Lever 138 has a cam roller 163 at its other end, shown in Fig. 6, bearing upon the face of cam 168 fast on main shaft 32. Just before the end of the forward movement of the main shaft is reached, cam 168 operates lever 138, rocking the left-hand end of that lever, as viewed in Fig. 6, downward. If at that time pin 139 is in the position in slot 488 shown in Fig. 6, pin 139 will simply be moved idly down in the nearly vertical arm of the L slot and link 143 will not be pulled downward and no punching will be performed. If, however, lever 141 has been rocked to the right, as viewed in Fig. 6, by means presently to be described, the lower part of link 143 will be rocked slightly to the right, moving the L-shaped slot so that pin 139 will now occupy the left-hand upper branch of the slot. If pin 139 is in this position in the slot when lever 138 is rocked, link 143 will be pulled downward to operate the toggle and force operating plate 154 to the left, causing the punching to be done. Spring 156 is secured to stud 157 in the framework and to plate 154 to return the parts to their normal positions at the end of the operation.

Levers 124 are operated in unison with plate 154 by means of a link 164 pivoted at 165, connected to one of the upright levers 338. At its other end link 164 is pivoted to the crank arm 166, fast to shaft 202, which shaft is mounted freely in both the side frames of the machine. The levers 124 are fast to this shaft. Thus the levers 124 move with plate 154 and push the punches back to their normal positions at the end of the operation. At the opposite end of shaft 202 is mounted the hour printing lever which will be described in connection with the printing mechanism.

Shaft 182 and other of the shafts which are used on one side of the machine only are not carried all the way across, but are supported at one end in a center frame casting 336, see Fig. 12. 128 is a pan or receptacle to receive the punchings from the dies to prevent clogging parts of the machine.

In Fig. 52 I have shown a modification of the punching mechanism. In this case, instead of having a series of punches, each representing a unit of a division of time and being stationary except in its punching movement through the card and a selector movable so as to engage with any punch of the series, I provide but one punch and mount it upon a vertically movable frame 455, which frame is in its vertical movement controlled just as are the punch selectors. In this case, frame 455 takes the place of the punch selector 144, the device in Fig. 52 representing the tens of minutes punching apparatus. In this case, in place of plate 154, I provide a plate 445 carried by the upright levers 338, provided with a series of teeth which engage the pointed rear end of the punch 443 in order to obtain a better and more accurate hold of the punch. The punch 443 has a collar 450 and encircling spring 444 to retract it, compressed between this collar and a projection 451 on frame 455, this guide plate having a hole in which the forward end of punch 443 is free to move. Frame 455 is provided with a vertical guide slot 490, through which guide rods 181 and 202 project to properly guide the frame in its vertical movements. The frame also carries a block 448, having in it a guiding hole 491 for receiving the punch 443 when forced through the card. 446 and 447 are walls of the card slot and are provided with vertical grooves 492, 493, in which work the block 448 and projection 451 respectively and which act as guideways for such parts and for the frame. These slots are long enough, of course, to permit the movement of the guide plate through its entire range of movement.

453 and 454 are parts of the frame 455. Movement is imparted to the frame through gear 167 meshing with rack 484, as already described. The cut-out 141 and connecting parts for determining whether the punching operation shall be operated or not will be described later, as will also be the devices for effecting the printing.

It will be understood from the above that the timing cams are always continuously driven by the master clock and the positions of the timing cams always represent the true time-of-day. Also that on the "in" or first operation of the machine or at the beginning of a telephonic communication, these timing cams will, through the connecting mechanism, control the type wheels 245, etc., and the punch selectors in their movement, the said wheels being moved from their zero positions to positions indicating the time-of-day as represented by the positions of the timing cams and the punch selectors being moved from their normal or zero position opposite the punches representing the time-of-day and that the further operation of handle 2 will cause the time-of-day representing the time of operation of the machine to be printed by the type wheels upon the card and a record representing the time of such operation will be also made upon the card by the punching mechanism punching holes in the card, the location of which holes upon the card represents such time.

At the second or "out" operation of the machine or at the close of a telephonic communication, the operator inserts the card reversely, as already described, and pulls forward the handle. This causes the timing cams to again move the type wheels 245, etc., the type wheels moving from their normal or zero position to which they have been returned at the end of the first operation, so as to again indicate by their position the time-of-day or the time of such second operation. It also again moves the punch selectors to the positions representing such second time. In the further operation of the handle 2, however, the type wheels 245, etc., will be moved backward a distance representing the time of the first operation, thus subtracting from the time of the second operation, represented by the position of the type wheels 245, etc., the time of the first operation, thus causing the type wheels to bring upon the printing line type representing the elapsed time between the two operations and in the later operation of the machine this time is printed upon the card. This subtracting operation is controlled by the time record previously made upon the card, as shown the holes previously punched in the card on the first operation. In one form of my apparatus, the cut-out mechanism is operated to prevent the punching operation taking place on this second operation. In another form, such punching takes place.

The control of the timing cams over the recording wheels and punching mechanism, in the preferred form of my invention shown in the drawings, is shown as exercised through the intermediate actuating means (sectors 246, etc., 176, etc.) operating those wheels and mechanism, changing the positions of the sectors 246, etc., constantly to correspond with the ever changing positions of the timing cams. It will be understood, of course, that my invention is not limited to that particular method or form and that such control may be had in other ways than through the actuating means, such for example, as through stops for the recording or punching mechanism controlled by the timing cams and limiting the movement of the recording and punching mechanisms toward the end of their stroke instead of controlling them at the beginning as shown.

I will now describe the devices shown by which the subtraction, controlled by the holes previously punched in the card, takes place upon the type wheels 245, etc.

*Subtracting mechanism.*—This is specially illustrated in Figs. 3, 7, 8, 9, 10, 12, 15, 16 and 17. The type wheels are controlled in their reverse or subtracting movement by means of the records of a previous operation of the machine as marked upon a card, these records, as shown, being in the form of holes punched in the card. This control, in the machine shown in the drawings, is effected through pin boxes, each comprising a series of pins representing different units of a division of time, which are mounted so as to be moved toward and away from the card, so that any pin corresponding to a hole in the card will project through into the path of a subtractor rack and thereby influence the extent of movement of that rack and thereby effect the extent of the subtracting movement imparted to the corresponding type wheel. Referring now to the specific mechanism shown, a pin box is arranged for each row of holes that may be punched in the record card. One of these pin boxes is shown in Fig. 7 in side view, namely, the one corresponding to the tenths type wheel. As all the pin boxes and their connecting mechanism are substantially the same, I will describe the tenths pin box in detail. This box is mounted at the top of a movable lever 203, loosely mounted on a rod 175 fast in the side frames of the machine. This lever carries at its upper end two struts 211 and 212, which together form a frame or box to hold the pins 209. There are ten of these pins and each one is provided with a collar 261 and a compression spring 210. The normal position of the parts is that shown in Fig. 7. The supporting levers for the other pin boxes are 346 for the units, 347 for the tens and 292 for the detector mechanism. These pin boxes and their levers are adapted to be moved toward and away from the card in the slot 1. The mechanism for this purpose consists of the piece 214, loosely mounted on rod 175 and fast with an arm 227, carrying at its other end a cam roller 228 bearing upon the surface of cam 230 fast on shaft 32. Piece 214 is provided at its upper end with a rod 213, which passes through an aperture in all of the pin box support levers 203, 346, 347 and 292. Pieces 214 and 227 are connected by a bushing 504 on rod 175 (see Fig. 10), to which bushing both of them are secured. The parts are shown in their normal positions in Fig. 7. It will be seen that the first movement of shaft 32 and cam 230 will cause piece 214 to be moved toward the right, as viewed in Fig. 7 and through rod 213 it will move all of the pin boxes to the right against any card that may be in the card slot. In the first operation of the machine in which an unpunched card has been in the slot, the pins will be stopped by the card and will not pass through the openings in the guide plate 260. Accordingly, in this operation the pins will simply rest idly against the card and will do no work. But in a second operation, where a card has holes punched in it, in a previous operation representing the time of that first operation, those pins which register with the punched holes in the card will pass through such holes and through the corresponding holes in the guide plate 260 and will project beyond it, as shown in Fig. 15. In this position, they will lie in the path of a shoulder 206 of a subtractor rack, that in Fig. 15 being 279, representing the units of minutes. A subtractor rack is, of course, provided for each type wheel. These racks are numbered 205, the tenths rack, 279 the units, 280 the tens and 332 the hour, as shown in Figs. 3, 10 and 12. These racks, in their normal or zero position, are at the upper end of their stroke, as shown in Fig. 7. Each rack is provided with a set of gear teeth 481, see Fig. 7, which meshes with a corresponding differential gear, as shown in that figure gear 238. These gears are as follows: 238 the tenths, 517 the units, 518 the tens and 309 the hour. Each subtractor rack is provided with two vertical slots 507 and 508 and through these project guide rods 218 and 222 secured to the side frames of the machine to permit the subtractor racks vertical movement and to guide that movement.

The subtractor racks 205, etc., are normally in their uppermost position. At each operation of the machine they are permitted to drop the entire length of the slots 507 and 508, by devices presently to be described, unless they sooner strike a pin 209 projecting through a hole in the card. In this downward movement they turn the differential gears 238, etc., to the left, as viewed in Fig. 7, and cause those gears to roll downward on the teeth 476 of time-of-day racks 235, etc. This motion is imparted through the differential racks 220, etc., through pinions 244 to the type wheels 245 etc., causing them to be moved clockwise, as viewed in Fig. 7. If no pins are projecting into the path of the subtractor racks, this movement will turn the type wheels 245 in one-half revolution and as two complete sets of type are arranged on the periphery of each of these type wheels, this downward movement would simply bring exactly the same type upon the reverse side of the wheel on to the printing line, thus not affecting the type on the printing line in any way, but where a pin projects through the card into the path of the shoulder 206 of a subtractor rack it will limit this downward movement to an extent representing the time represented by the particular hole in the card through which such pin projects. This will move the corresponding type wheel in a direction reverse to that in which it was moved by its corresponding time-of-day rack and thus subtract from the time-of-day upon that wheel, as previously indicated upon it through its time-of-day rack, the number of units represented by the corresponding hole in the time card, leaving the elapsed time in that sub-division of time between the first and second operations of the machine. There will then stand upon the corresponding type wheel on the printing line a type representing such elapsed time and this will be printed upon the card in the second operation of the machine.

In the normal position of the machine the differential gears 238, etc., will, it will be understood, be standing at the neutral or zero position. The movement of the time-of-day racks 235, etc., controlled by the timing cams 254, etc., and the actuating pawls 251 and connecting mechanism will cause the time-of-day racks to move the differential gears and their racks upward a distance corresponding to the positions of the timing cams and therefore to the times represented by those cams or the time of the operation of the machine and the subsequent operation of the subtractor racks 205, etc., in their subtracting operation will cause the differential gears and their racks to move downward a distance corresponding with the holes punched in a card, or in other words, with the time of a prior operation of the machine as thus represented on the card. This will move the time wheels backward a corresponding distance. The resultant positions of the respective type wheels will then represent the elapsed time between the two operations. In the operation of the machine shown, these two operations, the adding one performed through the time-of-day racks 235, etc., and the subtracting performed through the subtractor racks 205, etc., are performed simultaneously. If desired, the two operations may take place successively, one before the other, it being understood that the operation of the differential gears and their racks will be the same in all cases. Where, as in the present case the two series of racks move simultaneously, the differential gear will remain stationary until one of these movements has been concluded and will then be moved one way or the other during the remaining movement of the other part. The result is the same in either case. In case any differential gear goes below its normal or zero position, it will be necessary to borrow one from the type wheel of the next higher order. The mechanism for performing this will be presently described.

In order to keep roller 228 on arm 227 in contact with cam 230, a tension spring 226 is attached to piece 214 and at its other end to strut 178 secured to the framework.

In order to permit the subtractor racks 205, etc., to fall at the proper time and at other times to be held in their upper position, I provide a lever connected with the differential gear, loosely mounted on shaft 172 and normally held in its upper position by a rod 264. In Fig. 7 this lever for the tenths differential is 237. It is pivoted on rivet 239 of that differential, a slot 240 being provided to permit of the free movement of the parts. In Fig. 9, the same parts for the hour wheel are shown as lever 306, secured to rivet 308 of the hour differential and the slot is numbered 307. A similar arrangement is, of course, present for each of the other differential gears. The rod 264, secured to lever 262, holds all of these levers normally in their home position. A spring 229 is secured to lever 237 and a corresponding spring 305 is secured to lever 306. These and corresponding springs for the other levers are secured at the other end to strut 180. The purpose of these springs is to exert a strong downward pull on the levers 237, 306 and the other levers and their corresponding differential gears and racks. As soon as the machine starts, cam 231 rotates and allows roller 263 on the other arm of lever 262 to move inward toward shaft 32. This permits bell crank 262 to turn on its pivot 172 and allows the universal bar 264 to move downward and, therefore, allows the tension springs 229, 305, etc., to pull the differential gears and their racks 220, etc., downward. The other end of bar 264 is attached to lever 342 loosely pivoted on shaft 172. Thus while the addition is taking place upon the type wheels, the rod 264 is being lowered and the differential gears are free to move downward under the weight of subtractor racks 205, etc., and under the influence of springs 229, etc. The latter are moved downward by their own weight and by the aid of the before-mentioned springs 229, etc., and in this movement they carry with them the differential gear, the latter rolling down on the time-of-day racks 235, which are of course held in their position through their connections. Accordingly, the racks 205 move downward until stopped by a pin or until they have reached the limit of their downward movement, taking the differential gears and racks down with them and causing the subtracting operation to be performed upon the type wheels.

In order to make the operation clearer, I will give this illustration. Let us assume that the card 277 is inserted in the slot in the first operation and the handle 2 is pulled forward. This operation will punch the holes 428, 429, 430 and 431 in the card, as shown in Fig. 49. Paying attention only to the tenths mechanism, this operation has caused the tenths rack 235 to move upward eight points, corresponding to the position of the tenths timing cam 254 at the time of the first operation, which is in the position representing eight-tenths of a minute.

Rack 235, in moving upward eight points, will move the tenths differential gear 238 upward eight points. This distance will, of course, be only one-half of the actual distance of the rise of rack 235. But the pitch line of pinion 244 is of such a diameter that rack 220 may turn pinion 244 eight points, contra-clockwise or to the left, as shown in Fig. 7. Type wheel 245 is then turned to the left eight points, bringing the type from zero, which normally stands on the type line, to 8 and at the end of this operation are of course returned to their normal or zero position. Now when the card is inserted into the slot the second time, viz., at 4 hours, 13.2 minutes, with the tenths hole 431 punched in it, as described, the hole 431 in the card will come opposite the pin in the tenths pin rack, shown in Fig. 7, next to the bottom or the second from the bottom, as shown in Fig. 8, representing eight tenths of a minute. When rod 264 is removed from beneath lever 237, the differential gear 238 and its rack 220 will be pulled downward by spring 229 and rack 205 will fall. That rack will fall until its shoulder 206 strikes the projecting pin shown in Fig. 8. In other words, it will fall through a space representing eight units. Accordingly, the differential gear and its rack will go downward with it eight points and will turn the type wheel back eight points. This will bring the type on the type wheel from 2, to which it had been moved in the adding operation on the second or "out" operation of the machine, back to 4, or the difference between eight tenths and two tenths. A similar operation takes place on all of the racks on the differential gears.

In the above described operation of the tenths differential gear and its type wheel, it will be noted that the differential gear in its downward movement has dropped below its normal or zero position and the type wheel has been rotated back of its normal or zero position. Accordingly, one must be borrowed from the type wheel of the next higher order. Any suitable borrowing devices may be used. I will now proceed to describe the devices shown for this purpose.

In order to permit the borrowing operation to take place, I preferably cause the pin boxes, after they have been moved forward in the first part of their operation against the card, and after the subtractor racks have fallen and been caught by any projecting pins, to move backward slightly so as to withdraw the projecting pin from contact with the projection 206 to permit the subtractor rod to fall downward farther. I also provide each subtractor rack of a denomination higher than the lowest, namely, the subtractor rack for the units, tens and tenths, with a second projection or notch 374, clearly shown in Fig. 15. This shoulder or notch is made to the left and one point higher than that of shoulder or notch 206. Accordingly, when the pin box is moved back slightly, the pin clears shoulder 206, but still lies in the path of shoulder or notch 374. Accordingly, the subtractor falls one additional point, and with it its differential gear and its rack fall one point, subtracting one unit from the type wheel. In the devices shown, this is accomplished by the following mechanism. Cam 230 is slightly cut away at its right-hand end, as viewed in Fig. 7 and a light spring 225 is secured to each pin box support 203, etc. Accordingly, after the subtractor racks have fallen and been stopped by the pins, roller 228 goes forward slightly in the cut-away part of cam 230, permitting piece 214 to slightly fall back or to the left, as viewed in Fig. 7, carrying with it rod 213. This permits those of the pin supporting levers 203, etc., which are not held in their forward position by means to be described, to go back a short distance sufficient to enable the pins to clear the first notch 206 and to lie in the path of the second notch 374. To prevent those of the pin boxes from going backward where borrowing is not desired, I provide a series of catch levers 268 loosely mounted on rod 217. These catches 268 are adapted to engage catches 243 secured to supporting pin box supports 346 and 347, etc., see Fig. 8. A light spring 242 tends to hold the catches 268 and 243 in engagement. When the pin box supports are moved forward, or to the right, as viewed in Fig. 8, these catches engage and hold these supports and their pin boxes to the right. Whenever any differential gear goes below the normal or zero position, its corresponding catch is released. This is accomplished by means of a pin 273 projecting from one ear 479 of the differential, which is adapted in such operation to engage a cam surface 241 at the right-hand lower end of latch 268, see Fig. 15. The springs 242 are secured to a rod 215. Accordingly, those of the pin supports and boxes in which the borrowing operation is not required, are held in their right-hand position, shown in Fig. 15, with the projecting pin engaging the right-hand shoulder 206 and those in which borrowing is required, the catch is released and the pin boxes fall slightly to the left, as already described. In order to permit this movement of one or more of the pin supports and not of others, the opening 494 in the pin box supports, through which rod 213 passes, is made slightly larger than the rod, as shown in Fig. 15. Fig. 15 illustrates a catch in position and Fig. 16 a catch released. In the latter case, one is borrowed from the type wheel of the next higher order. It will be understood, of course, that on the lowest or tenths subtractor rack only one notch 206 is provided, shown in Fig. 7. All of the other subtractor racks are provided also with the additional borrowing notch 374. In the position of the parts shown in Fig. 16, the rod 213 prevents the pin box and its support from going backward any greater distance than just sufficient to clear notch 206, but not sufficient to clear notch 374. Two of these subtracting catches are provided, one for the units and the other the tens of minutes. This one for the units is shown in Fig. 15 and is numbered 268, with cam 241 and the other shown in Fig. 10 is for the tens and is numbered 509, with cam 241. The pins connected with the differential or actuating borrowing device of the next higher wheel, as shown, consist of the pin 273 secured to the rack 220 of the tenths differential 238 and the pin 341 (see Fig. 10) connected to the rack 281 of the units differential gear 517.

As the pin boxes go forward on the first movement, the catch levers 268 and 509 are pivoted to move into operative or catching position. The means for this, as shown, consist of a link 302 (see Fig. 9) pivoted at 304 to the arm 342 and at its other end pivoted at 303 to plate 331, which is freely pivoted on rod 217. A similar plate 331 is freely pivoted on the same shaft 217 and a universal rod 216 is secured to both of these plates. The purpose of having two plates 331 is merely to strengthen the apparatus. The catch levers rest against this rod 216 and are lifted out of engagement or let into engagement at the proper time. When the universal bar 264 drops down, it pulls rod 216 downward, permitting the catches to engage with the catches 243 etc., on the pin box supports. They are now in position for the borrowing operation when it becomes necessary. Toward the close of the operation of the machine, when rod 264 is moved back to its normal position, rod 216 also moves to the left, as shown in Figs. 8 and 9 and lifts the lever catches 268 out of engagement, permitting the pin boxes to drop back into their original position. The pin box for use in the tens column is illustrated in Fig. 17. As shown, there are, of course, only six pins.

*Detector mechanism.*—This mechanism is particularly illustrated in Figs. 1, 6 and 9. In the last column of the pin boxes, that is, where the hour pin box would be if elapsed time were being registered in hours, there is a pin box 287, 288, which is provided with a single pin 290. This pin I call the detector pin, since it is used for detecting whether a card has been previously introduced in the machine or not and for the purpose of operating cut-out mechanism to cut out of operation punching mechanism if the card had been previously introduced. 126, see Fig. 6, is the detector punch for punching such a detector hole 428 in the card. It is mounted in the guide plates 260, 146, like the other punches and is similarly provided with a compression spring 127 and a collar 123. It is operated by means of a punch operating stud 145 fast to plate 154. When a card is first introduced, punch 126 punches a detector hole like that of 428 in the card of Fig. 49. When the card is introduced for the second time with a detector hole punched in it, as shown in Fig. 9, the detector pin 290 enters the detector hole 428 in the card. This operates a cut-out mechanism as follows. A hook link 294 is provided resembling the subtractor racks 205, etc., at its upper end. It is provided at its upper end with an extension 495. When this hook link 294 drops with the subtractor racks, it encounters detector pin 290, if that projects through a hole in the card, link 294 is arrested in its downward movement. Link 294 is pivoted at its lower end to bell crank lever 296 at 295. This bell crank is fast on shaft 142 and is pivoted at its other end, 297, to the link 298, which is attached by screw 299 to link 302, previously described. This screw works in a slot 510, as shown, and the link 298 is kept at one end of the slot by a tension spring 300, secured at 301 to link 302. As link 294 is arrested in its downward movement by a detector pin, the spring 300 is slightly stretched by the continued movement of link 302 to the right, as already described. As bell crank 296 and the lever 141, previously described, are both fast on shaft 142, lever 141 is prevented from being rotated downward and to the right, as viewed in Fig. 6, as it would be if the rotation of shaft 142 were not thus arrested. Accordingly, pin 139 will remain in the right-hand or vertical portion of L-shaped slot 488 in link 143 and the punching mechanism will not be operated. If no detector pin is inserted into the path of extension 495 of link 294, however, the rotation of lever 141 to the right will continue and the punching operation will be performed. This takes place, in the devices shown, when an unpunched card is introduced into the slot. Detector pin 290 is provided with a collar 291 and a compression spring 289 and is mounted on a supporting lever 292, loosely mounted on shaft 175 and having an opening 494, through which rod 213 passes, just as in the case of the other pin supporting levers. Any suitable printing mechanism may be employed. I will now describe that shown in the drawings.

*Printing mechanism.*—This is particularly illustrated in Figs. 6–9 inclusive, 12, 38, 39 and 44. It consists of two pressure printing pads 137 and 318, pad 137 printing the minutes and tenths of minutes and pad 318 printing the hours, when such printing is required. Referring to the printing pad 137 for printing the minutes, 132 (see Fig. 6) is a forked lever which has meshing with it the round nose 134 of a projecting end of operating lever 138, already described. As lever 138 operates every time the machine is operated, the minutes are printed at every operation, whether elapsed time is being printed or merely time-of-day. Printing pad 137 is adjusted relatively to lever 132 by means of an eccentric 135, fast on the arm of the printing pad, revolved by screw 136, see Fig. 44. Eccentric 135 has a worm wheel 496 cut on its surface engaging with the screw-threads of screw 136. Lever 132 is loosely mounted on the stationary shaft 133.

The hour printing pad 318 is operated by the lever 315, see Fig. 9, fast on shaft 202. As this shaft is operated, as has been already described, only when the punching operation is actually taking place, the hour is printed only at such an operation, or in other words, in the form of machine shown in the drawings, the hour is printed only on the "ringing in" operation of the machine. A rounded head of lever 315 meshes with a rounded cup on lever 316, loose on stationary shaft 133. Lever 316 is connected to lever casting 293 carrying the hour printing pad 318. The two parts are adjusted by means of a screw 317 meshing with a worm, not shown, on the casting 293, the parts corresponding to the adjustment already described for the minute printing pad.

*Ink ribbon mechanism.*—This is especially illustrated in Figs. 2, 5, 10 and 45. It consists of the ordinary ribbon spools mounted on studs, fed forward by ratchet wheels. One of these spools 42 is shown in Fig. 2. 41 is the ratchet wheel feeding it forward. The spool is mounted on stud 43. 37 is a click pawl loosely mounted on stud 497, provided with a tail 38 which rests against the lower edge of feeding pawl 34. This feeding pawl is mounted on the upper end of lever 35 and has a downwardly projecting tail 512, which is connected by a tension spring 39 through a tail 511 of click pawl 37. Lever 35 is fast on shaft 36, as is also a feeding lever 31. Pawl 34 has an elongation 40 to engage the shifting mechanism, presently to be described. Lever 31 is provided with a slot 33 in its upper end, which is so shaped that when pin 30, fast to arm 29, secured to the main shaft of the machine, describes the arc through which it moves on the rocking of that shaft, that lever 31 will be moved forward, or to the right, shown in Fig. 2, during the first part of the stroke and will then remain stationary while the pin 30 completes its travel in the uppermost part of slot 33, owing to the inclination of that slot to the left, as shown in Fig. 2. The other spool, shown in Fig. 5, is numbered 105 and its ratchet 106 and the stud on which it is mounted 107. 101 is the click pawl, 102 the surface bearing on its feeding pawl 98, the latter having the elongation 104 and pivoted to lever 100 at 99, lever 100 being fast on shaft 36. Click pawl 98 has a tail 514. 103 is the spring connecting this tail with tail 513 of click pawl 101. These parts are similar in all respects to those already described with reference to spool 42.

The ribbon shifting mechanism is best shown in Fig. 45. The plate 183 is secured to both of the side frames 66 and 68. Lever 186 is freely pivoted to it at 184. This lever tilts from one side to the other as occasion may require and moves into engagement, or removes from engagement either of the feeding pawls above described. Fast on the large plate 183 is a plate 188, carrying a spring 189 adapted to engage with any one of the three pins 190. The inside of the spring is so shaped that it presses inward against the pins 190 and between them and thus tends to keep the lever 186 in either one of the two positions into which it may be moved. Another lever 187 is pivoted to plate 183 at 185. This lever is bent up at its ends so as to form two slender forks 197, 197 at one end and 195, 195 at the other, these forks straddling the ink ribbon 44, as shown. A roller 191 is pivoted at 193 to lever 187. The pivot 193 is very small and is many times smaller than the opening or hole in the center of the roller 191. A flat spring 192 is fastened to the side frame 68 of the machine and it is provided with a V-shaped end, as shown. An opening 194 is provided in plate 183 large enough to allow of considerable movement of the lever 187 on the plate 183 and large enough to permit the insertion of the roller and its connecting parts. A loop 201 is sewed in the ink ribbon at each end a short distance from the end, as shown in Fig. 47. As the forks 197 and 195 at the ends of lever 187 are close together, these loops are unable to pass through the forks. But as the ribbon is being fed, for example, as indicated by the arrows in Fig. 45, the loop 201 at the left-hand end of the ribbon, as shown in that figure, will engage fork 197 and will gradually force the left-hand end of lever 187 upward and the right-hand end downward. When it has moved lever 187 a sufficient distance, roller 191 will suddenly jump over the V-shaped lower end of spring 192 and will cause the left-hand end of lever 187 to hit the knob 199 on lever 186 a sharp blow. This will throw this lever into its other position and will throw one feeding pawl in and the other out of operation. On the right-hand end of lever 186 the knob is 200, corresponding with knob 199.

343 and 344 are compression springs which are used to exert pressure between the sides of the ink ribbon spools and a collar fast to the end of the shaft on which they rotate so as to keep a tension on the ribbon.

198 and 196 are rearwardly extending projections which engage ends 40 (Fig. 2) and 104 (Fig. 5) of the feeding pawls.

In order to guide the pin boxes in their movement toward and away from the card slot, I preferably provide grooves 498, see Fig. 9, in a flat plate 67, which is fastened to the side frames 66 and 68 (see Fig. 3) and place upon the top of each of the pin box struts 287, 376, 370 and 211, pins 286, 375, 369 and 204, the pins moving in the slots.

The method of fastening the cover to the casing is illustrated in Figs. 2, 3 and 5. At the rear of the side frame 66 is fastened a pin 49, see Fig. 2, and at the front end a pin 458. 46 is a spring pressed hook, 499 being its spring, 46 being fastened to the side frame by the screw 45. At the opposite side of the front of the machine the same parts are used, the spring pressed hook there being numbered 78 and the pin 77. At the opposite side of the rear end from the pin 49 is a similar pin 110. A compression spring 80 is also provided, see Fig. 5. There are four downward independent lugs from the top plate 3, numbered respectively 47, 48, 76 and 109. The lugs 48 and 109 are hook-shaped, as shown in Figs. 2 and 5. The other two hooks 47 and 76 are made to receive the hooks 46 and 78 and also to engage the pins 458 and 77, as shown in Figs. 2 and 5. If it is desired to remove the top plate, the two hooks 46 and 78 are disengaged from the lugs 47 and 76, the cover is then tilted up to an angle of about 10° and is then readily shoved toward the back of the machine, when the two extensions 48 and 109 will be freed from the pins 49 and 110 and the cover may be lifted off.

In Figs. 53–56 inclusive I have illustrated a form of my device in which the record of the time of the operation of the machine made upon the record card by punching holes representing the time of such operation is made at each and every operation of the machine, the "ringing out" operation as well as the "ringing in". The parts of the machine are just the same as in the form already described, with the exception that the cut-out mechanism is omitted and there is, of course, no detector hole punched in the card and no detector mechanism is used. Otherwise the operation of the parts of the machine shown in these figures is exactly the same as the corresponding parts already described and it will not be necessary to further describe the apparatus shown in these figures, except in connection with the card.

The card preferably used is shown in Figs. 55 and 56, Fig. 55 showing the card after the first or "ringing in" operation and Fig. 56 showing the opposite side of the card after the "ringing out" operation. It will be noticed that the hour is printed at each of these operations. Preferably I use a card which has printed upon one side of it a scale representing the tens and units of minutes and the tenths of minutes. In Fig. 56 this scale is shown as printed on the "start" side of the card. This scale is preferably employed both for the "ringing in" and for the "ringing out". In the card of Fig. 56, the scale at the left represents the scale for the "ringing in" and the one at the right for the "ringing out". It will be seen that the holes punched on the scale for the "ringing in" or "time connected" indicate five minutes and eight tenths as the "in" time and the scale at the right as thirteen minutes and two tenths of a minute as the "out" time. The elapsed time between these two is, of course, seven minutes and four tenths of a minute, as printed at the top of the card opposite "elapsed time". The punched holes on the card, therefore, furnish a visual check or verification means. The scale may, of course, be arranged in any suitable manner.

In describing the operation of adding and subtracting upon the time type wheels, I have in the previous description, for the sake of clearness, spoken of the adding operation as if taking place first and the subtracting operation as if taking place afterward. Such an arrangement of the parts could be made as to bring about such a successive operation, if desired. But in the form of machine shown, these two operations take place substantially simultaneously. For example, the adding and subtracting racks move the one up and the other down at the same time. If they move at the same rate, their differential gears, while, of course, still rotating, would stand still so far as linear up and down motion is concerned, until one or the other had stopped in its movement and the gear would then be moved along the stationary one by the one continuing the movement. The movement of each differential gear depends upon the resultant of or the difference between the movement of its adding and subtracting racks and it is immaterial whether the racks move simultaneously or successively or partly one and partly the other. In this connection, it is to be noted that even in the first operation of the machine the subtractor racks drop, and in this case as there are no projecting pins in their paths, they drop their entire distance. This simply has the effect of turning their gear wheels backward or in the subtraction direction a distance representing the full complement of units of that particular division of time, the tenths wheel, for instance, moving ten points. This operation, of course, has no effect on the resultant movement of the gear wheel and its indicating wheel. It simply brings the same type that is on the opposite side of the wheel on the printing line and does not in any way interfere with the adding operation controlled by the timing cams.

In my preferred form, the differential gear mechanism is shown as a single floating gear wheel provided with a rack meshing with its type wheel. Of course, the form of this differential mechanism can be varied, as it is not essential that it should be in the shape of a wheel. The main point, so far as the differential is concerned, is that it is a single piece of mechanism supported by the adding and subtracting mechanisms so as to be free to move on one or the other, depending upon the resultant movements of such mechanisms.

It will, of course, be understood that in using the terms "adding" and "subtracting" in this specification and the claims, I intend to include the complement of those terms as a full equivalent. Thus, for example, instead of adding six points in any movement, the same result exactly is obtained upon the adding mechanism by subtracting the complement, viz., by subtracting 4, and the above terms are used broadly to include any such complement.

The term "card" as used herein, is used broadly to indicate any proper record surface, no matter of what material it is made or what its shape. The time marks upon such a card are not necessarily restricted to holes punched therein, as any suitable marks capable of actuating selector devices to control the subtracting operation are within its meaning.

It will also, of course, be understood that in the specification and claims the use of any language indicating the movement of one part toward or to another part would include a movement of the second toward or to the first so long as the same result is obtained.

Many modifications and changes may, of course, be made in the specific form of apparatus shown in the drawings other than those herein specifically referred to, without departing from my invention.

My improvement possesses many advantages, some of which have been already set forth in one place or another in this specification. It provides an elapsed time recording machine which is very simple in its construction and easy in its operation; one in which there is only one slot, only one handle or operating means, and one in which there is only one set of type wheels for printing either the time of operation of the machine or the elapsed time between two operations. It is a device in which there is but a single differential gear and that a floating one, simple and accurate in operation.

My improved device has relatively few parts, is strong and durable, is flexible in those parts of the operation which require delicacy of operation and is positive in those movements that require considerable power. It is peculiarly well adapted for recording differences in elapsed times that are short in duration, as for example, the recording of the duration of telephonic communications, although it is not, of course, limited to any such uses.

What I claim as new and desire to secure by Letters Patent, is:—

1. In a time recorder the combination of time recording mechanism adapted to be set and to give an imprint or time record and an impulse mechanism for transmitting power to set the time recording mechanism in accordance with time and to operate the recording mechanism to cause it to record such time, the impulse mechanism being adapted to be flexible or yielding at that part of its operation which sets the time recording mechanism and to be rigid in that part of its operation in which it operates the recording mechanism to cause it to make a record.

2. In a time recorder the combination of time recording mechanism, operating means for setting it in accordance with time and for causing it to make a record, and connections between the two for transmitting power from the operating means to set the recording mechanism in accordance with time and to operate it to cause it to make a record, adapted at one part of the operation to furnish a yielding or flexible connection to set the recording mechanism and at another part of the operation to furnish a rigid connection during the recording operation.

3. In a time recorder the combination of operating means, recording mechanism and connections between the two for transmitting power from the operating means to the recording mechanism adapted in the earlier part of the operation to furnish a yielding or flexible connection to set the recording mechanism in position to record and at a later part to furnish a rigid connection to actuate the recording mechanism to make a record.

4. In a time recorder the combination of time recording mechanism, operating means for setting it in accordance with time and for operating it to cause it to make a record, connections between the two for transmitting power from the operating means to the recording mechanism containing a flexible or yielding portion and a rigid portion, and means for making operative the flexible or yielding portion of the connections in that part of the operation in which the time recording mechanism is set in accordance with time and for making operative the rigid portion in that part of the operation in which the recording is done.

5. In a time recorder the combination of operating means, recording mechanism, connections between the two for transmitting power from the operating means to the recording mechanism containing a flexible or yielding portion and a rigid portion, and means for making operative the flexible or yielding portion of the connections at one part of the operation to set the recording mechanism in position to record and for making operative the rigid portion at a later part of the operation to actuate the recording mechanism to make a record.

6. In a time recorder the combination of a handle, time type wheels, punches, a clock for controlling the type wheels and punches, printing platens, punch-operating devices, connections between the handle and the type wheels, punches, printing platens and punch-operating devices containing a flexible or yielding portion and a rigid portion, and means for making operative the flexible or yielding portion of the connections at one part of the operation to set the type wheels and punches in position to record and for making operative the rigid portion at a later part of the operation to actuate the printing platens and punch-operating devices.

7. In a time recorder the combination of a handle, time type wheels, a clock for controlling the type wheels, printing platens, connections between the handle and the type wheels and printing platens containing a flexible or yielding portion and a rigid portion, and means for making operative the flexible or yielding portion of the connections at one part of the operation to set the type wheels in position to record and for making operative the rigid portion at a later part of the operation to actuate the printing platens.

8. In a time recorder the combination of a handle, punches, a clock for controlling the punches, punch-operating devices, connections between the handle and the punches and punch-operating devices containing a flexible or yielding portion and a rigid portion, and means for making operative the flexible or yielding portion of the connections at one part of the operation to set the punches in position to record and for making operative the rigid portion at a later part of the operation to actuate the punch-operating devices.

9. In a time recorder the combination of a handle, time type wheels, punches, punch-selecting devices, a clock for controlling the type wheels and punch-selecting devices, printing platens, punch-operating devices, connections between the handle and the type wheels, punch-selecting devices, printing platens and punch-operating devices containing a flexible or yielding portion and a rigid portion, and means for making operative the flexible or yielding portions of the connections at one part of the operation to set the type wheels and punch-selecting devices in a position to record and for making operative the rigid portion at a later part of the operation to actuate the printing platens and punch-operating devices.

10. In a time recorder the combination of a handle, punches, punch-selecting devices, a clock for controlling the punch-selecting devices, punch-operating devices, connections between the handle and the punch-selecting devices and punch-operating devices containing a flexible or yielding portion and a rigid portion, and means for making operative the flexible or yielding portion of the connections at one part of the operation to set the punch-selecting devices in a position to record and for making operative the rigid portion at a later part of the operation to actuate the punch-operating devices.

11. In a time recorder the combination of operating means, recording mechanism, a main driving shaft adapted to operate the recording mechanism, a spring connection between the operating means and the shaft adapted to impart movement from the operating means to the shaft in one part of the operation to set the recording mechanism in position to record, and a rigid connection adapted at a later part of the operation to be operative between the operating means and the shaft in order positively and rigidly to operate the recording mechanism to make a record.

12. In a time recorder the combination of operating means, recording mechanism, a main driving shaft adapted to operate the recording mechanism, a spring connection between the operating means and the shaft adapted to impart movement from the operating means to the shaft in one part of the operation to set the recording mechanism in position to record, a part connected with the operating means and a part connected with the shaft, the said parts being normally out of operating engagement with each other, and means for operatively engaging one of said parts with the other at a later part of the operation to make a rigid connection between the operating means and the shaft.

13. In a time recorder the combination of operating means, recording mechanism, connections between the two containing a flexible or yielding portion, and retarding means for retarding the movement of the recording mechanism to a predetermined rate.

14. In a time recorder the combination of operating means, recording mechanism, connections between the two containing a flexible or yielding portion, and retarding means for retarding the movement of the recording mechanism to a predetermined rate, a lock for temporarily arresting the movement of the operating means, if moved too rapidly, to permit the movement of the recording mechanism to overtake that of the operating means and means for rendering rigid the connections between the operating means and the recording mechanism when the movement of the latter has overtaken that of the former.

15. In a time recorder the combination of operating means, recording mechanism, an impulse mechanism connecting the two adapted to permit the operating means to be moved more rapidly than the recording mechanism and a lock for temporarily arresting the movement of the operating means until the movement of the recording mechanism has overtaken such movement.

16. In a time recorder an impulse mechanism containing a flexible or yielding connection between the driving part and the driven part of the machine, a retarding device for limiting the movement of the driven part to a predetermined rate, a lock for temporarily arresting the movement of the driving part to permit the movement of the driven part to overtake it, means for removing such lock from operative position and for rigidly connecting the driving and the driven parts during a later part of the operation.

17. In a time recorder the combination of time recording mechanism adapted to be set and a single impulse mechanism adapted at one part of the operation of the machine to furnish a flexible or yielding connection to set the time recording mechanism in accordance with time and at another part of the operation to furnish a rigid connection between the driving and the driven parts parts of the machine.

18. In a time recorder the combination of time recording mechanism adapted to be set, a single impulse mechanism for setting the time recording mechanism and for operating the recording mechanism, and means for changing it from a flexible or yielding character to a rigid character, whereby the connection between the driving and the driven parts of the machine may be flexible or yielding for the lighter and more delicate movements and may be rigid for the harder or more severe operations.

19. In an elapsed time recording machine the combination of time recording mechanism and means for operating it to cause it to record either the time-of-day or elapsed time.

20. In an elapsed time recording machine a set of time type wheels adapted to print either time-of-day or elapsed time.

21. In an elapsed time recording machine the combination of time recording mechanism, timing cams controlled by a clock, means for setting the time recording mechanism in accordance with the position of the timing cams to indicate the time-of-day, and means for moving the recording mechanism in a reverse direction and to an extent representing a prior time to indicate elapsed time between the said prior time and the time of setting the recording mechanism from the timing cams.

22. In an elapsed time indicating machine the combination of time type wheels, timing cams controlled by a clock, means for setting the type wheels at any time controlled by the position of the timing cams at such time, and means for moving the type wheels in a reverse direction controlled by time marks on a card representing the time of a prior operation of the machine, whereby either the time-of-day or the elapsed time between two operations may be recorded by the same set of type wheels.

23. The combination of a computing device, a cam for controlling it, means for moving the cam to represent different values, and actuating means for operating the computing device, the said actuating means being controlled by the cam and adapted normally to be in engagement therewith but during the operation of the computing device to be moved out of such engagement.

24. The combination of a time recording device, means for actuating it, a timing cam controlled by a clock, a wiper in engagement with the cam, a controller for the recording device whose position at any time depends upon the position of the wiper and whose control of the time recording device depends upon its own position at the time of the actuation of such device.

25. The combination of a time recording device, a timing cam controlled by a clock, a wiper in engagement with the cam, an actuator for the time recording device controlled by the wiper and the extent of whose actuation of the time recording device is dependent upon its own position at the time of actuation, and driving means engaging with the actuator to cause it to move the time recording device to an extent dependent upon the position of the actuator at such time.

26. In a time recorder the combination of a type wheel, a timing cam controlled by a clock, an actuator normally in engagement with the timing cam and whose position is normally dependent upon the movement of the timing cam but adapted to be moved out of engagement with said cam, and driving means having always the same extent of movement and adapted in such movement to engage with the actuator to move it out of engagement with the timing cam and into engagement with the type wheel, whereby the type wheel will be moved in accordance with the position of the timing cam to represent time-of-day and whereby the further movement of the timing cam during the recording operation will not be interfered with by such operation.

27. In a time recorder the combination of a type wheel, a timing cam controlled by a clock, and actuating means for the type wheel controlled by the timing cam and adapted normally to be in engagement with the cam but adapted during the operation of actuating the type wheel to be moved out of engagement with the timing cam.

28. In a time recorder the combination of a time recording device, a timing cam controlled by a clock, and actuating means for setting the time recording device, the said actuating means being controlled by the timing cam and adapted normally to be in engagement therewith but during the setting operation to be moved out of such engagement.

29. In a time recorder the combination of a punching device for punching a time hole in a card, a timing cam controlled by a clock, and actuating means for setting the punching device in position for punching, said actuating means being controlled by the timing cam and adapted normally to be in engagement therewith, but adapted to be removed from such engagement during the setting of the punching device.

30. In a time recorder the combination of a type wheel, a punching device, a timing cam controlled by a clock, and actuating means for setting the type wheel and punching device, said actuating means being controlled by the timing cam and adapted normally to be in engagement with the cam, but adapted to be removed from such engagement during the setting operation.

31. In a time recorder the combination of a type wheel, a punching device, a timing cam controlled by a clock movement, a common intermediate actuator for the type wheel and punching device, the position of which actuator at any time is dependent upon or controlled by the timing cam, and driving means for the actuator having always the same extent of movement and adapted in some part of such movement to engage with and operate the actuator, whereby the extent of movement of the type wheel and punching device at any operation will be dependent upon the position occupied by the actuator at the time of such operation and whereby the type wheel will be adapted to print and the punching device to punch on any suitable record surface the time represented by the position of the timing cam and actuator.

32. In a time recorder the combination of a card, a card slot provided with guides for accurately registering the card in the slot, a timing cam controlled by a clock movement, a punching device whose location is dependent upon the position of the timing cam, and means for operating the punching device to punch a hole in the card, whereby the location of the hole in the card will give a record of the time of operation.

33. The combination of a time indicating wheel, a differential gear wheel connected with and adapted to move the indicating wheel one way or another as the differential gear moves one way or the other, clock controlled mechanism in engagement with the differential gear and adapted to move it one way in accordance with the true time, and means also in engagement with the differential gear wheel and adapted to move it the opposite way in accordance with a prior time, whereby both the differential gear wheel and the time indicating wheel will be moved to represent the elapsed time between the time of the operation of the machine and such prior time.

34. The combination of a time indicating wheel standing normally at zero, a differential gear wheel also standing normally at zero and connected with the indicating wheel and adapted to move it one way or the other as the differential gear wheel moves, clock controlled mechanism in engagement with the differential gear wheel and adapted to move it and with it the indicating wheel in a positive or adding direction away from the zero position in accordance with the time of such operation, and means also in engagement with the differential gear wheel and adapted to move it and with it the indicating wheel in the reverse direction in accordance with a prior time, whereby both the differential gear wheel and the time indicating wheel will be moved to represent the elapsed time between the time of operation of the machine and such prior time.

35. The combination of a time indicating wheel, a differential gear wheel connected therewith and adapted to move the indicating wheel one way or the other as the gear wheel moves, two racks between which the differential gear is mounted and by which it is supported, clock controlled mechanism for moving one of the racks one way in accordance with the time of such operation, and means connected with the other rack and adapted to move it in a reverse direction in accordance with a prior time, whereby both the differential gear wheel and the time indicating wheel will be moved to represent the elapsed time between the time of operation of the machine and such prior time.

36. The combination of a time indicating wheel standing normally at zero, a differential gear wheel also standing normally at zero and connected with and adapted to move the indicating wheel one way or the other as the differential gear wheel moves, two racks between which the differential gear is mounted and by which it is supported, clock controlled mechanism for moving one rack in one direction to move the differential gear and with it the indicating wheel in a positive or adding direction from the zero point, and means to move the other rack the opposite way in accordance with a prior time to move the differential gear and the indicating wheel in the reverse direction, whereby the differential gear will be moved along the two racks in accordance with the resultant of such two movements and the indicating wheel will indicate the elapsed time between the time of the operation of the machine and the said prior time.

37. The combination of an elapsed time type wheel standing normally at zero, a floating differential gear wheel standing normally at zero and having a rack engaging the elapsed time type wheel, two racks with which the floating differential gear wheel meshes and by which it is supported, clock controlled means for moving one of the racks one way so as to cause it to tend to move the differential gear and with it the type wheel one way from the zero point to add upon the wheel, and means controlled by time marks upon a card representing a prior time to move the other rack to cause it to tend to move the differential gear and type wheel in the reverse direction to that in which they are moved by the other rack in order to subtract upon the type wheel, whereby the type wheel will indicate the elapsed time between the prior time and the time of operation of the machine.

38. The combination of elapsed time type wheels standing normally at zero, a differential gear wheel for each type wheel also standing normally at zero connected with and adapted to move the said type wheel one way or the other, two racks for each differential gear wheel by which it is supported and along which it is free to move, clock controlled means for moving one rack of each set one way to move its differential gear and type wheel in the adding direction away from the zero point, means controlled by time records on a card representing the time of a prior operation for moving the other rack of each set in a reverse direction in accordance with such prior time to subtract the same on the type wheels, and means for borrowing one from the next higher type wheel whenever the differential gear of the next lower order is moved back of the zero point.

39. The combination of an elapsed time type wheel, a differential gear wheel connected therewith, means controlled by a clock movement for moving the differential gear one way to indicate the time of such operation, means for moving the differential gear in the reverse direction in accordance with a prior time to subtract upon the elapsed time type wheel such time from the time of the other operation, all so connected and arranged that the operations of adding and subtracting upon the differential gear and elapsed time type wheel may be proceeded with simultaneously.

40. In elapsed time indicating mechanism, the combination of a series of pins representing different subdivisions of time, and a movable pin frame adapted to move the pins against a record card to permit the projection through any hole in the card of a pin registering with said hole to affect the extent of movement of subtracting mechanism.

41. In elapsed time indicating mechanism, the combination of a series of pins representing different subdivisions of time, a movable pin frame adapted to move the pins against a record card to permit the projection through any hole in the card of a pin registering with said hole to affect the extent of movement of subtracting mechanism, and means for moving the pin frame back a slight distance to cause the said pin to project a less distance through the hole to permit a further feeding of the subtraction mechanism one unit's distance for borrowing purposes.

42. In elapsed time indicating mechanism, the combination of a pin representing a unit of time, a movable pin frame carrying the pin and adapted to move it against a record card to permit the pin to project through any hole in the card registering therewith to affect the extent of movement of subtracting mechanism, and means for moving the pin backward slightly to cause it to project a less distance through such hole in the card to permit a further feeding of the subtraction mechanism one unit's distance for borrowing purposes.

43. In elapsed time indicating mechanism, a series of pins adapted to be moved against a record card to permit the projection through a hole in the card of any pin registering therewith to affect the extent of movement of subtracting mechanism and means for moving any such pin backward slightly to cause it to project a less distance through such hole to permit a further movement of the subtracting mechanism for borrowing purposes.

44. The combination of elapsed time type wheels, means for moving them one way to cause them to represent the time of an operation of the machine, a series of pins for each wheel representing different subdivisions of time, a subtractor device for each wheel provided with two projections and adapted to move its wheel in the reverse direction, a movable pin frame adapted to move the pins against a record card to permit the projection through any hole in the card of a pin registering with such hole into the path of one of the projections on the subtractor device to limit the extent of its subtracting movement to correspond with the time value represented by the hole in the card through which such pin projects, means adapted to be actuated when the elapsed time type wheel of the next lower order is moved back of the zero point for moving the pin frame backward slightly to cause such pin to project a less distance through said hole so as to engage with the second projection on the subtractor device, to permit a further movement of the subtractor device one point for borrowing purposes.

45. The combination of elapsed time type wheels, means for moving them one way to cause them to represent the time of an operation of the machine, a series of pins for each wheel representing different subdivisions of time, a subtractor device for each wheel provided with two projections and adapted to move its wheel in the reverse direction, a movable pin frame adapted to move the pins against a record card to permit the projection through any hole in such card of a pin registering with such hole into the path of one of the projections on the subtractor device to limit the extent of its subtracting movement to correspond with the time value represented by the hole in the card, a catch for holding each pin frame in such position, means actuated by the type wheel of the next lower order when it passes back of the zero point for releasing the catch, means for moving the pin frame backward a slight distance to cause such pin to project a less distance through said hole to bring it into the path of the second projection on the subtractor device to permit a further feeding of the subtractor device one point for borrowing purposes.

46. In the subtracting mechanism of an elapsed time indicating machine, a subtractor device provided with two projections for controlling the extent of its subtracting movement, one projection adapted to be used in its ordinary subtracting movement and its other projection adapted to be used for borrowing purposes.

47. The combination of elapsed time indicating mechanism, a floating differential gear mechanism connected with the indicating mechanism and adapted to move it one way or the other in an adding or subtracting direction as the gear mechanism moves one way or the other, actuating mechanism controlled by a clock movement for moving the differential gear mechanism and the elapsed time indicating mechanism in one direction to indicate the true time, and subtracting mechanism controlled by time records of a prior operation adapted to move the differential gear mechanism and the indicating mechanism in the reverse direction, the differential gear mechanism engaging with and being supported by the actuating mechanism and the subtracting mechanism and adapted to move thereon one way or the other depending upon the resultant of the movements of the actuating mechanism and the subtracting mechanism.

48. The combination of elapsed time indicating mechanism, a floating differential gear mechanism connected with the indicating mechanism and adapted to move it one way or the other in an adding or subtracting direction as the gear mechanism moves one way or the other, actuating mechanism controlled by a clock movement for moving the differential gear mechanism and the elapsed time indicating mechanism in one direction to indicate the true time, and subtracting mechanism controlled by time records of a prior operation adapted to move the differential gear mechanism and the indicating mechanism in the reverse direction, the differential gear mechanism engaging with and being supported by the actuating mechanism and the subtracting mechanism and adapted to move thereon one way or the other depending upon the resultant of the movements of the actuating mechanism and the subtracting mechanism, and means for borrowing one from the indicating mechanism of one denomination of time adapted to be actuated by the floating gear mechanism of the next lower denomination when such mechanism is moved in the subtracting direction past its zero or neutral position.

49. In a time recorder the combination of a card, a punching device for punching a time hole in the card representing the time of the punching, a timing cam controlled by a clock, and actuating means for setting the punching device in position for punching, the said actuating means being controlled, as to the extent of its movement, by the timing cam.

50. In a time recorder the combination of a type wheel, a punching device, a timing cam controlled by a clock, and actuating means controlled by the timing cam for setting the type wheel and punching device in position for recording.

51. In a time recorder a series of type wheels, a timing cam for each wheel controlled by a clock movement, a wiper for each cam adapted normally to be in engagement with the cam and to vary its position in accordance with the position of the cam, a part connected with the wiper adapted to be moved a certain predetermined distance to move the wiper out of engagement with its cam and in some part of said movement and to move into engagement itself with mechanism connecting with its type wheel, and driving means for imparting such movement to the part connected with the wiper, whereby the extent of actuation of the type wheel by the wiper mechanism will be dependent upon the position of the wiper at the commencement of its movement.

52. In a time recorder the combination of a type wheel standing normally at zero, a timing cam controlled by a clock movement for actuating the type wheel to indicate the time of such actuation by moving the type wheel in one direction, and subtracting mechanism adapted to be actuated in accordance with a prior time for moving the type wheel in the reverse direction.

53. In a time recorder the combination of a series of type wheels standing normally at zero, a series of timing cams, one for each wheel, controlled by a clock movement, each cam adapted to actuate its type wheel and represent the time of such actuation by moving the wheel in one direction, a series of subtracting devices, one for each wheel, each subtracting device adapted to move its wheel in the reverse direction in accordance with the time of a prior operation, and means for borrowing one from each type wheel when the type wheel of a lower denomination is moved backward or in the subtracting direction beyond the zero point.

54. In the subtracting mechanism of an elapsed time indicating machine, the combination of a subtracter device adapted to fall and by the extent of its falling movement to move the elapsed time indicating mechanism a corresponding amount in the subtracting direction, and a stop to limit the falling movement of the subtracter device, whose position and consequent limiting function are controlled by a record representing a prior time.

55. In the subtracting mechanism of an elapsed time indicating machine, the combination of a subtracter device adapted to fall and by the extent of its falling movement to move the elapsed time indication mechanism a corresponding amount in the subtracting direction, and a series of pins adapted to be controlled by a time record hole on a card to limit such falling movement of the subtracter device.

56. In the subtracting mechanism of an elapsed time indicating machine, a subtracter device adapted to fall and by the extent of its falling movement to control the movement of the elapsed time indicating mechanism in its subtracting operation, two projections or said device and a stop adapted normally to engage one projection in the ordinary subtracting operation of the parts and adapted to engage with the other projection when borrowing becomes necessary.

57. In the subtracting mechanism of an elapsed time indicating machine, a movable pin frame provided with pins adapted to project through any registering hole in a time record card to affect the extent of the subtracting operation of the elapsed time indicating mechanism, a catch for normally holding the pin frame in such operative subtracting position, and means actuated by the indicating mechanism of the next lower order when it passes back of zero for releasing the catch to permit the pin frame to move so as to bring any projecting pin into position to permit a borrowing movement of its indicating mechanism.

58. In the subtracting mechanism of an elapsed time indicating machine a pin, adapted to be controlled by a record of a prior time to limit the subtracting movement of the indicating machine and adapted to be moved into a second position to permit a borrowing movement of its indicating mechanism and adapted to be controlled in this movement by the indicating mechanism of a next lower order when it passes back of the zero point.

59. In the subtracting mechanism of an elapsed time indicating machine, a subtracting device provided with two projections, means controlled by the time record of a prior operation for engaging with one projection to limit the subtracting movement in accordance with the time represented by such time record and means for causing such means, controlled by the time record, for engaging with the second projection for borrowing purposes.

60. In an elapsed time indicating machine, the combination of a card slot, a reversible card, time indicating mechanism, a subtracting device for moving the time indicating mechanism in a subtracting direction, and a selecting device for controlling the extent of movement of the subtracting device adapted to be actuated by a time record on the card representing a prior operation of the machine when such card is inserted reversely in the card slot.

61. In an elapsed time indicating machine, the combination of a card slot, a reversible card, time recording mechanism, clock controlled means adapted to cause the time recording mechanism to make a record on one part of the card representing the time of an operation of the machine, a subtracting device adapted at a later operation of the machine to move the time recording mechanism in the subtracting direction, a selecting device for controlling the extent of such movement of the subtracting device, adapted to be actuated by the time record made on the card at the previous operation of the machine, when said card at the later operation is inserted reversely in the slot.

62. In an elapsed time indicating machine, the combination of a card slot, a reversible card, punching mechanism, clock controlled means adapted to cause the punching mechanism to punch a hole in one part of the card representing the time of an operation of the machine, a subtracting device adapted on a later operation of the machine to move the elapsed time indicating mechanism in a subtracting direction, and a selecting device for controlling the extent of such subtracting movement, adapted to be actuated by the time hole punched in the card at the previous operation of the machine, when such card on the later operation is inserted reversely in the slot.

63. In an elapsed time indicating machine, the combination of a card slot, a card, time recording mechanism for making a time record on the card of an operation of the machine, a subtracting device for subtracting at a later operation of the machine on the elapsed time indicating mechanism, and a selecting device for controlling the extent of such subtracting movement, the time recording mechanism and the selecting device being so arranged relatively to the slot that, if the card is introduced in the slot one way to make a record and on a second operation is introduced in another way, the time record previously made on the card will register with the selecting device and will control its operation.

64. The combination of elapsed time indicating mechanism, a card slot, a card, punching mechanism, clock controlled means adapted to cause the punching mechanism to punch a hole in one part of the card representing the time of an operation of the machine, a subtracting device for moving the elapsed time indicating mechanism in a subtracting direction, and a selecting device for controlling the extent of such subtracting movement, adapted to be actuated by the hole previously punched in the card on the first operation, the punching mechanism and selecting device being so arranged relatively to the slot that when the card is introduced into the slot on the second operation reversely, the hole previously punched on the first operation will register with the selecting device and will control its operation.

65. In a time recorder the combination of recording mechanism, a card, a record thereon, cut-out mechanism adapted to be actuated by the record on the card at a subsequent operation of the machine to prevent the operation of the recording mechanism at such second operation of the machine.

66. In a time recorder the combination of punching mechanism, a card, a hole punched therein by the punching mechanism representing the time of an operation of the machine, cut-out mechanism adapted at a later operation of the machine to be actuated by the hole previously punched on the card at the first operation and to prevent the operation of the punching mechanism on such second operation of the machine.

67. In a time recorder the combination of a card, punching mechanism adapted to punch a hole in the card representing the time of an operation of the machine, a pin adapted to be moved into engagement with the card and to pass through the hole at a subsequent operation of the machine, a cut-out mechanism adapted to be actuated by such pin when it projects through the hole and adapted on such later operation of the machine to prevent the actuation of the punching mechanism.

68. In a time recorder the combination of time controlled punching mechanism, adapted to punch holes in a card to represent the time of an operation of the machine, a card, a device adapted on a later operation of the machine to be effected by a hole previously punched in the card at the earlier operation to actuate cut-out mechanism, and cut-out mechanism adapted when thus actuated to prevent the operation of the punching mechanism on the later operation of the machine.

69. In a time recorder the combination of a detector punch for punching a detector hole in a card, and a detecting device adapted on a later operation of the machine to be operated by such hole and to cut out of operation the recording mechanism.

70. In a time recorder the combination of a card, a detector punch for punching a hole in the card, a pin adapted at a second operation of the machine to pass through such hole, and cut-out mechanism adapted to engage with such pin while projecting through the hole and to be thereby made operative.

71. The combination of a time recording device, means for actuating it, a timing cam controlled by a clock, a wiper adapted normally to be in engagement with the timing cam but adapted to be moved out of such engagement during the actuation of the time recording device, a controller for the recording device whose position at any time depends upon the position of the wiper and whose control of the time recording device depends upon its own position at the time of the actuation of such device.

72. The combination of a time recording device, a timing cam controlled by a clock, a wiper adapted normally to be in engagement with the timing cam but to be moved out of such engagement during the actuation of the time recording device, an actuator for the time recording device controlled by the wiper and the extent of whose actuation of the time recording device is dependent upon its own position at the time of actuation, and driving means engaging with the actuator to cause it to move the time recording device to an extent dependent upon the position of the actuator at such time.

73. The combination with elapsed time indicating mechanism adapted to be controlled in one movement of its elapsed time indicating operation by a record on a card, of a card slot and operating means, whereby with one card slot and one operating means a record may be obtained from the elapsed time indicating mechanism representing either time-of-day or elapsed time.

74. The combination with elapsed time indicating mechanism adapted to be controlled in one movement of its elapsed time indicating operation by a record on a card, of a card slot and operating means adapted to accomplish all of its work in a single movement in one direction, whereby with one card slot and one operating means a record may be obtained in the elapsed time indicating mechanism representing either time-of-day or elapsed time.

75. The combination of type wheels, timing cams controlled by a clock for moving the type wheels in one direction to indicate the time of operation of the machine, a single card slot, a single operating means, a card, subtracting mechanism adapted to be controlled in its subtracting movement by a time record on the card and adapted when thus controlled to move the type wheels in the reverse direction in accordance with the time record on the card, whereby through one slot and one operating means the same type wheels may be used to record the time-of-day or elapsed time.

76. In an elapsed time recording machine the combination of a card slot, a card, a time recording device, time controlled punching mechanism arranged at one side of the card slot and adapted to punch one or more holes in the card upon an operation of the machine representing by their location upon the card the time of such operation, time controlled means for moving the time recording device one way in accordance with the true time, means for moving the said device the reverse way, pins for controlling the extent of movement of the said reverse movement means, the said pins being arranged upon the opposite side of the card slot from the punching mechanism and adapted to be themselves controlled in their control of the said reverse movement means by the hole or holes punched in the card, all so arranged that, when the card is inserted in the slot with one face toward the time recording device and punching device and the machine is operated, the time of such operation will be printed and punched upon the card and, when at a later operation of the machine the card is inserted in the slot with the opposite face toward the printing device, the punched hole or holes will register with the pins and elapsed time will be printed upon the card by the time recording device.

77. In a time recording machine the combination of a time recording device, a clock controlled timing cam, and connections between the timing cam and the time recording device including a device for actuating the time recording device, said actuating device being normally in engagement with the timing cam and adapted to be moved by it to positions representing different values of time, and adapted to actuate the time recording device in accordance with the position it occupies at the time of the operation of the machine.

78. In a time recording machine the combination of a time recording device, a clock controlled timing cam, and connections between the timing cam and the time recording device adapted to connect them to move the latter to correspond to the position of the former to indicate time of day or to disconnect the two, and a subtracting device for moving the time recording device the reverse way in accordance with the time of a prior operation of the machine, whereby the same time recording device may at one time record the time of day of the operation of the machine and at another time the elapsed time between two operations of the machine.

79. In an elapsed time recording machine the combination of time controlled recording mechanism, time controlled punching mechanism for punching holes in a card on the first or "In" operation, a device for punching a detector hole at said operation, and connections with the first mentioned punching mechanism controlled by the detector hole at the second operation to render the said punching mechanism inoperative at the second operation.

80. In an elapsed time recording machine the combination of time recording mechanism arranged on one side of the machine, time controlled punches arranged on the opposite side of the machine adapted to punch holes in the card at the first operation, a reversible card, a series of pins on the side of the machine opposite the punches, and connecting mechanism adapted to be controlled by pins projecting through holes previously punched in the card when the card is inserted reversely to that of its position at the first operation for controlling the recording mechanism.

81. In a time recorder the combination of a series of time recording devices, a series of punching devices, one for each recording device, a series of timing cams controlled by a clock movement, one cam for each recording device and its corresponding punching device, a common intermediate actuator for each type-wheel and its corresponding punching device, the position of which actuator is dependent at any time upon or is controlled by the corresponding timing cam, driving means for the actuators, a series of subtracting devices, one for each type-wheel, a series of pin boxes, one for each subtracting device, and a series of cross-overs from the actuators to the punching devices so arranged that the punching devices will stand in the reverse order from which the time recording devices, subtracting devices and pin boxes stand in the machine, whereby, when a card is inserted in the machine, it will have the time of the operation printed upon it and a series of holes punched in it and, when the card is inserted at a second operation of the machine with its face reversed, the punched holes will register with the pin boxes, subtracting devices and recording devices and in the same order and will control the operation of the pin boxes and subtracting devices and permit the elapsed time between the first and second operations to be indicated on the recording devices.

82. In the operating mechanism of an elapsed time indicating machine a differential, a time controlled device for rotating it one way in accordance with the time of such operation, and a subtracting device controlled by a prior operation of the machine for rotating the differential the other way in accordance with such prior time, whereby the resultant of the reverse rotations of the differential will represent the elapsed time between the said two operations of the machine.

83. In the operating mechanism of an elapsed time indicating machine a floating differential free to rotate and to move in a linear direction, a time controlled device for moving the differential in a linear direction one way in accordance with the time of such operation, a subtracting device adapted to rotate the differential and move it in the opposite linear direction in accordance with the time of such prior operation, whereby the resultant linear movement of the differential will represent the elapsed time between the said two operations of the machine.

84. In the operating mechanism of an elapsed time indicating machine, a plurality of differentials each free to move either way in a linear direction and standing normally at zero, a time controlled device for each differential adapted to move its differential in one linear direction to represent the time of such operation, a subtracting device for each differential controlled by the time of a prior operation of the machine and adapted to move its differential in the opposite linear direction in accordance with such prior time, and means for each differential of a lower denomination adapted to borrow one from the differential of the next higher denomination whenever its differential passes the zero point.

85. The combination of time recording mechanism, clock controlled timing cams, cam wipers normally in engagement with the cams and movable therewith, and means for removing the cam wipers from contact with the timing cams and causing them to control the operation of the recording mechanism in accordance with the position of the cam wipers at the time of operation of the machine.

86. The combination of time recording mechanism, operating means consisting of two parts, one for setting the recording mechanism in accordance with time and at a relatively rapid rate as compared with the performance of the recording operation, and another part for performing the recording operation retarded at the earliest part of its operation, and adapted to perform its recording work at a later part in the operation.

87. In the operating mechanism of an elapsed time indicating machine, a floating differential normally at zero adapted to be moved one way to cause the recording mechanism to be moved to indicate present time and to be moved the other way in accordance with a past time to move the recording mechanism the reverse way in accordance with such past time, whereby the recording mechanism will indicate the elapsed time between the two operations.

88. In an elapsed time indicating machine, a floating differential normally at zero and adapted on moving one way to affect the recording mechanism in one direction in accordance with present time, and to move the other way to affect the recording mechanism in the reverse direction to indicate a past time, and means for causing one to be borrowed when the differential passes below zero.

89. In a time recorder the combination of time recording mechanism and a floating differential mechanism for controlling the movement of the time recording mechanism one way or the other.

90. In a time recorder the combination of time recording mechanism and a floating differential mechanism for controlling the movement of the time recording mechanism one way or the other, said floating differential mechanism being controlled in its movement one way by a clock movement representing the time of such operation and in its movement the other way by a prior time.

91. The combination of a clock-controlled cam, a recording device, connections between the two adapted, when operated to set the recording device in accordance with the position of the cam, whereby the recording device, when operated, will make a corresponding time record, and mechanism adapted to be controlled by the said time record to affect or control a subsequent time record.

92. The combination of a clock-controlled cam, a punch adapted to punch holes in a suitable record card, connections between the cam and punch adapted, when operated to set the latter in accordance with the position of the cam, whereby the punch, when operated, will punch a time hole in the card representing the time corresponding to such position of the cam, and mechanism adapted to be controlled by a time hole thus punched in the card to affect or control a subsequent time record.

93. In a time recorder the combination of a card, a punch for punching holes in the card, a clock-controlled device adapted to control the relative position of the card and punch in accordance with time at a first operation of the machine to cause a record of such time to be made on the card, the said record coöperating with the said device and card at a second operation of the machine to cause a record to be made upon the card representing the elapsed time between the two operations.

94. In a time recorder the combination of a card, a detector punch for punching a hole in the card, and means adapted, at a subsequent operation of the machine, to be controlled by the hole for affecting the record whereby the record of the machine at a second operation will be differentiated or distinguished from the initial or preliminary record.

95. In a time recorder the combination of a card, a detector punch for punching a hole in the card, and means adapted, at a subsequent operation of the machine, to coact with the hole to affect the subsequent record.

96. A machine of the class described adapted to make records on a card and including in combination recording devices, previous-reading devices adapted to be controlled by perforations in a card, and supplementary devices controlled by perforations in the card and located at the side of the card opposite the previous-reading devices.

97. In a machine of the class described in combination, a recording mechanism and means for automatically suppressing the action of part of said mechanism when a card is in proper position to receive a record, said means being adapted to be controlled by perforations in a card.

98. A workman's time recorder including in combination, a minuend mechanism which registers the total advance of the machine, a subtrahend mechanism which registers the position of the machine at a previous operation, a difference member moved forward by one of said mechanisms and backward by the other, and recording mechanism controlled by said difference member.

99. In combination, a difference member comprising means adapted to increase and means adapted to diminish its extent of movement, and adapted to assume a mean position in accordance with the values of the movements imparted thereto, and a printing plate $j$ actuated thereby and carrying on its face two series of types from 0 to 9 both arranged in increasing order in the same direction so as to represent the movement of the difference member in either direction from the neutral position.

In testimony whereof, I have signed my name to this specification, in the presence of two subscribing witnesses.

JAMES W. BRYCE.

Witnesses:
EDWIN SEGER,
JOHN O. GEMPLER.